(12) United States Patent
Nam et al.

(10) Patent No.: US 12,063,729 B2
(45) Date of Patent: Aug. 13, 2024

(54) SOUND AND LIGHT EXPERIENCES

(71) Applicant: Sonos, Inc., Santa Barbara, CA (US)

(72) Inventors: Youjin Nam, Santa Barbara, CA (US);
Dayn Wilberding, Portland, OR (US);
Shilpa Sarode, Cambridge, MA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 17/856,337

(22) Filed: Jul. 1, 2022

(65) Prior Publication Data

US 2023/0007752 A1 Jan. 5, 2023

Related U.S. Application Data

(60) Provisional application No. 63/217,740, filed on Jul. 1, 2021.

(51) Int. Cl.
*H05B 47/105* (2020.01)
*G06F 3/16* (2006.01)
*H05B 47/155* (2020.01)
*H05B 47/165* (2020.01)

(52) U.S. Cl.
CPC .......... *H05B 47/105* (2020.01); *G06F 3/16* (2013.01); *H05B 47/155* (2020.01); *H05B 47/165* (2020.01)

(58) Field of Classification Search
CPC . G06F 3/16; G06F 3/165; G06F 3/167; H05B 47/105; H05B 47/12; H05B 47/155; H05B 47/165; H05B 47/19
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | Dilorenzo |
| 6,404,811 B1 | 6/2002 | Cvetko et al. |

(Continued)

FOREIGN PATENT DOCUMENTS

| | | | | |
|---|---|---|---|---|
| CN | 107889323 B | * | 5/2020 | ............ H05B 47/12 |
| EP | 1389853 A1 | | 2/2004 | |

(Continued)

OTHER PUBLICATIONS

Machine Translation of CN107889323B (Year: 2018).*

(Continued)

*Primary Examiner* — Raymond R Chai

(57) ABSTRACT

An example playback device is configured to: (i) determine given audio content that is to be played back by the playback device; (ii) identify at least one frequency range in the given audio content; (iii) for each identified frequency range in the given audio content, determine a respective lighting behavior that is to be produced, by a lighting device that is communicatively coupled with the playback device, during playback of the identified frequency range in the given audio content; (iv) play back the given audio content comprising the at least one identified frequency range; and (v) cause the lighting device to produce the determined lighting behavior in synchrony with playback of the identified frequency in the given audio content.

21 Claims, 12 Drawing Sheets

(56) References Cited

U.S. PATENT DOCUMENTS

| | | | |
|---|---|---|---|
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 11,234,315 | B2 * | 1/2022 | Shen ........................ H05B 45/39 |
| 11,244,558 | B2 * | 2/2022 | Altamura ................ H05B 47/19 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2018/0077777 | A1 * | 3/2018 | Horist ..................... H05B 45/20 |
| 2019/0274206 | A1 * | 9/2019 | Altamura ................ F21V 23/003 |
| 2021/0142708 | A1 * | 5/2021 | Seo ............................ G09G 5/02 |
| 2021/0176842 | A1 * | 6/2021 | Zhang ....................... H03F 3/68 |
| 2021/0233389 | A1 * | 7/2021 | Kim ...................... H05B 47/105 |
| 2021/0318847 | A1 * | 10/2021 | Sullivan .................. G10L 25/51 |
| 2022/0243877 | A1 * | 8/2022 | Rodinger ................ F21S 2/005 |
| 2023/0059497 | A1 * | 2/2023 | Salzinger .............. F21V 23/009 |

FOREIGN PATENT DOCUMENTS

| | | |
|---|---|---|
| WO | 200153994 | 7/2001 |
| WO | 2003093950 A2 | 11/2003 |

OTHER PUBLICATIONS

Audio Tron Quick Start Guide, Version 1.0, Mar. 2001, 24 pages.
Audio Tron Reference Manual, Version 3.0, May 2002, 70 pages.
Audio Tron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D&M Holdings* (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Potuck, Michael. Philips Hue unveils new HDMI TV box that lets smart lights color match what you watch. https://9to5mac.com/2019/09/17/philips-hue-match-smart-lights-with-tv/. Sep. 17, 2019, 5 pages.

* cited by examiner

FIG. 1F                    FIG. 1G

SOUND AND LIGHT EXPERIENCES

CROSS-REFERENCE TO RELATED APPLICATIONS

This application claims priority to U.S. Provisional Application No. 63/217,740 filed Jul. 1, 2021, and entitled "Sound and Light Experiences," the contents of which are herein incorporated by reference in their entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of an example network microphone device.

FIG. 1G is a block diagram of an example playback device.

Figure 1A:
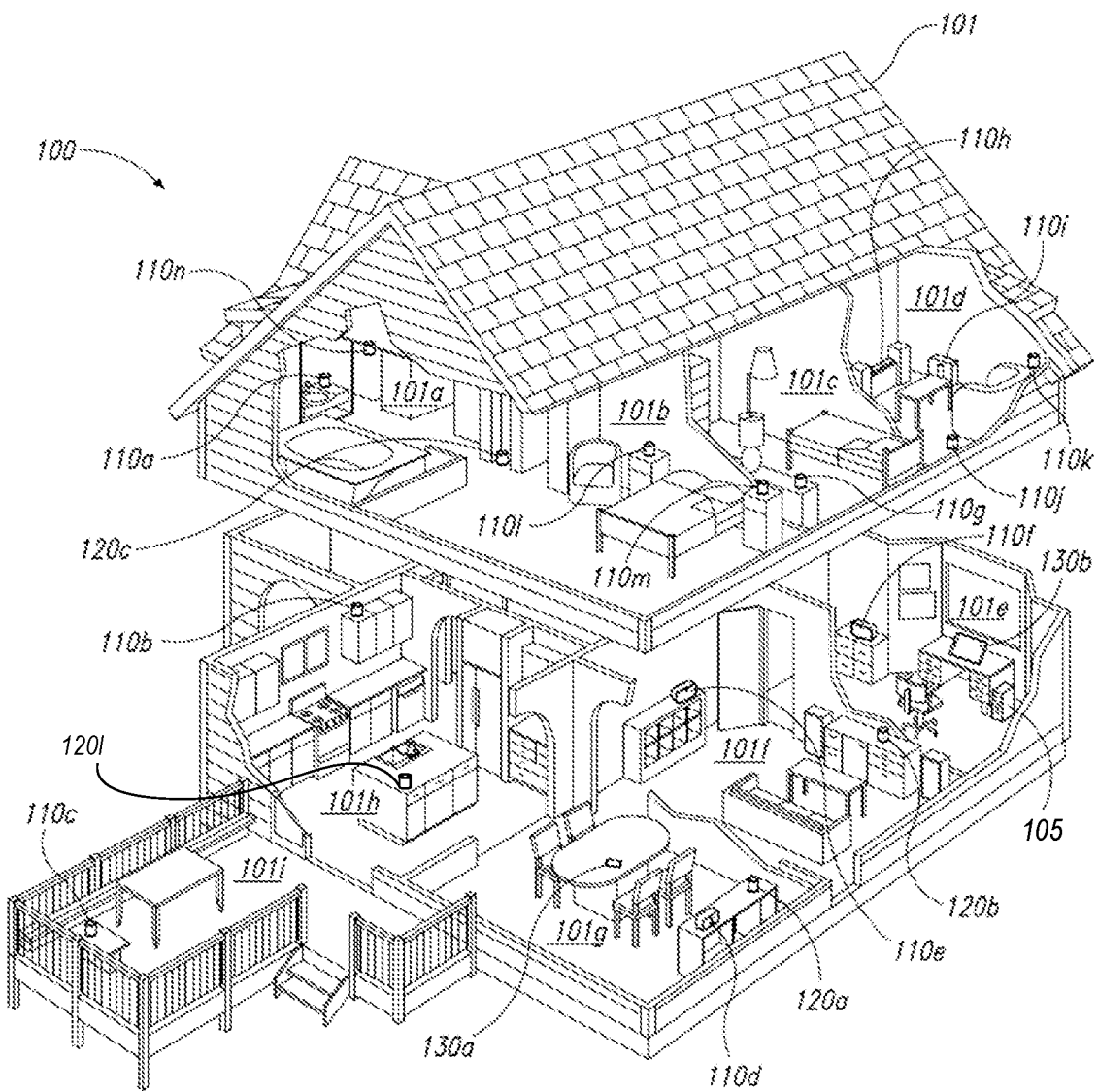
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Throughout one's day, different types of listening moments can occur. Some activities call for personal listening moments while other moments are centered around room-filling sound. Sound helps to create and/or support different listening moments or moods and foster a more personal, meaningful, and targeted interaction with one's environment. The directionality of sound, layering of sound, or types of sound can be selected to create particular listening moments or moods. Listening experiences can be further enhanced when accompanied by corresponding lighting effects that add a lighting component to create a more immersive and comprehensive audiovisual experience. Accordingly, disclosed herein are various modes of operation, techniques, and embodiments for creating sound and light experiences.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

In the figures, identical reference numbers identify generally similar, and/or identical, elements. To facilitate the discussion of any particular element, the most significant digit or digits of a reference number refers to the figure in which that element is first introduced. For example, element 110a is first introduced and discussed with reference to FIG. 1A. Many of the details, dimensions, angles and other features shown in the figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment a. Suitable Media Playback System

Figure 1B:
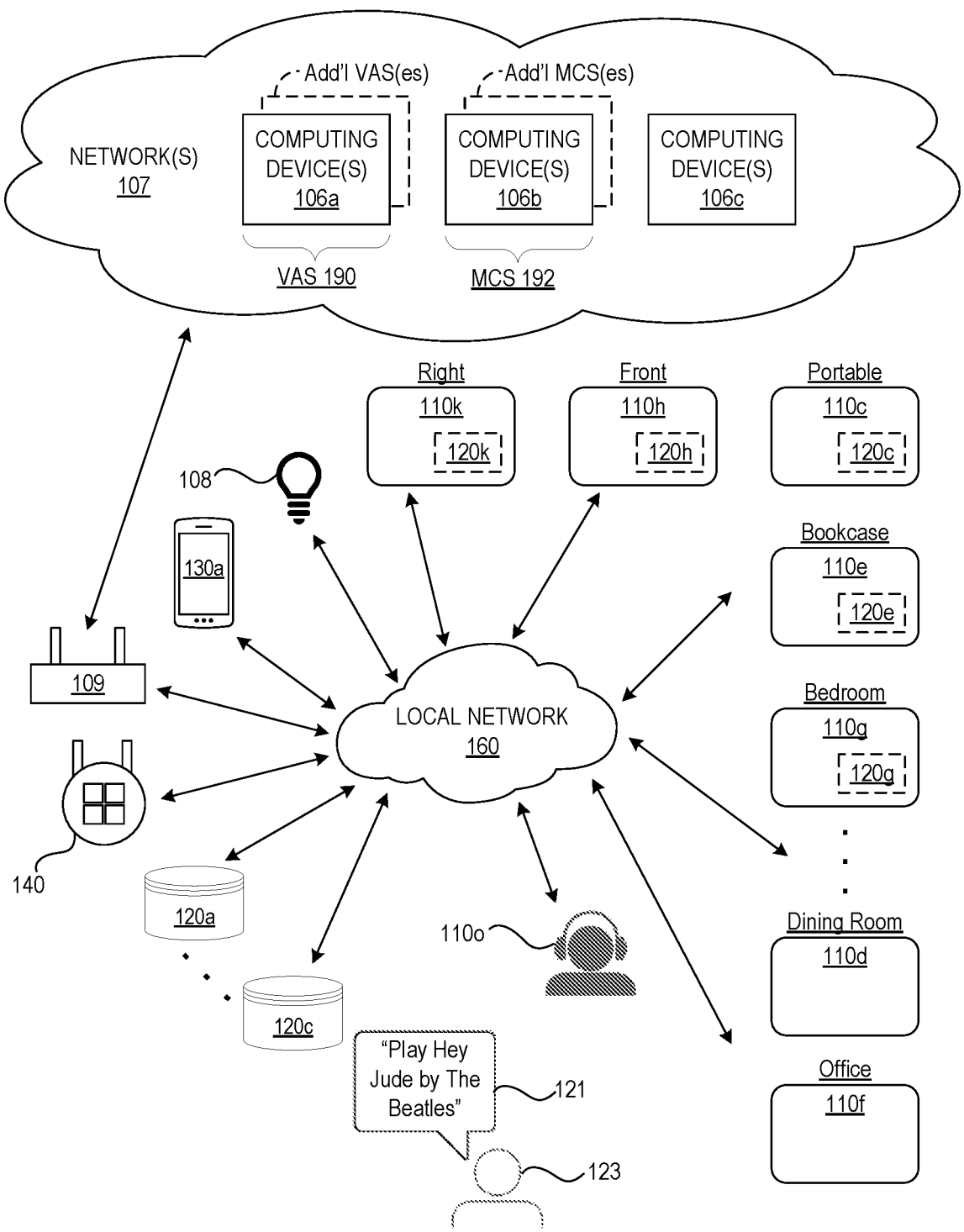
FIG. 1B is a schematic diagram of the media playback system of FIG. 1A and one or more networks.

FIGS. 1A and 1B illustrate an example configuration of a media playback system ("MPS") 100 in which one or more embodiments disclosed herein may be implemented. Referring first to FIG. 1A, a partial cutaway view of MPS 100 distributed in an environment 101 (e.g., a house) is shown. The MPS 100 as shown is associated with an example home environment having a plurality of rooms and spaces. The MPS 100 comprises one or more playback devices 110 (identified individually as playback devices 110a-o), one or more network microphone devices ("NMDs") 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the MPS 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the MPS 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the MPS 100 is configured to play back audio from a first playback device (e.g., the playback device 100a) in synchrony with a second playback device (e.g., the playback device 100b). Interactions between the playback devices 110, NMDs 120, and/or control devices 130 of the MPS 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a Master Bathroom 101a, a Master Bedroom 101b, a Second Bedroom 101c, a Family Room or Den 101d, an Office 101e, a Living Room 101f, a Dining Room 101g, a Kitchen 101h, and an outdoor Patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The MPS 100 can comprise one or more playback zones, some of which may correspond to the rooms in the environment 101. The MPS 100 can be established with one or more playback zones, after which additional zones may be added and/or removed to form, for example, the configuration shown in FIG. 1A. Each zone may be given a name according to a different room or space such as the Office 101e, Master Bathroom 101a, Master Bedroom 101b, the Second Bedroom 101c, Kitchen 101h, Dining Room 101g, Living Room 101f, and/or the Patio 101i. In some aspects, a single playback zone may include multiple rooms or spaces. In certain aspects, a single room or space may include multiple playback zones.

In the illustrated embodiment of FIG. 1A, the Master Bathroom 101a, the Second Bedroom 101c, the Office 101e, the Living Room 101f, the Dining Room 101g, the Kitchen 101h, and the outdoor Patio 101i each include one playback device 110, and the Master Bedroom 101b and the Den 101d include a plurality of playback devices 110. In the Master Bedroom 101b, the playback devices 110l and 110m may be configured, for example, to play back audio content in synchrony as individual ones of playback devices 110, as a bonded playback zone, as a consolidated playback device, and/or any combination thereof. Similarly, in the Den 101d, the playback devices 110h-j can be configured, for instance, to play back audio content in synchrony as individual ones of playback devices 110, as one or more bonded playback devices, and/or as one or more consolidated playback devices.

Referring to FIG. 1B, the home environment may include additional and/or other computing devices, including local network devices, such as one or more smart illumination devices 108 (FIG. 1B), a smart thermostat 140 (FIG. 1B), and a local computing device 105 (FIG. 1A). Numerous other examples of local network devices (not shown) are also possible, such as doorbells, cameras, smoke alarms, televisions, gaming consoles, garage door openers, etc. In embodiments described below, one or more of the various playback devices 110 may be configured as portable playback devices, while others may be configured as stationary playback devices. For example, the headphones 110o (FIG. 1B) are a portable playback device, while the playback device 110e on the bookcase may be a stationary device. As another example, the playback device 110c on the Patio 101i may be a battery-powered device, which may allow it to be transported to various areas within the environment 101, and outside of the environment 101, when it is not plugged in to a wall outlet or the like.

With reference still to FIG. 1B, the various playback, network microphone, and controller devices and/or other network devices of the MPS 100 may be coupled to one another via point-to-point connections and/or over other connections, which may be wired and/or wireless, via a local network 160 that may include a network router 109. For example, the playback device 110j in the Den 101d (FIG. 1A), which may be designated as the "Left" device, may have a point-to-point connection with the playback device 110k, which is also in the Den 101d and may be designated as the "Right" device. In a related embodiment, the Left playback device 110j may communicate with other network devices, such as the playback device 110h, which may be designated as the "Front" device, via a point-to-point connection and/or other connections via the local network 160.

The local network 160 may be, for example, a network that interconnects one or more devices within a limited area (e.g., a residence, an office building, a car, an individual's workspace, etc.). The local network 160 may include, for example, one or more local area networks (LANs) such as a wireless local area network (WLAN) (e.g., a WIFI network, a Z-Wave network, etc.) and/or one or more personal area networks (PANs) (e.g. a BLUETOOTH network, a wireless USB network, a ZigBee network, an IRDA network, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WIFI" can refer to several different communication protocols including, for example, Institute of Electrical and Electronics Engineers (IEEE) 802.11a, 802.11b, 802.11g, 802.12, 802.11ac, 802.11ac, 802.11ad, 802.11af, 802.11ah, 802.11ai, 802.11aj, 802.11aq, 802.11ax, 802.11 ay, 802.15, etc. transmitted at 2.4 Gigahertz (GHz), 5 GHz, 6 GHz, and/or another suitable frequency.

The MPS 100 is configured to receive media content from the local network 160. The received media content can comprise, for example, a Uniform Resource Identifier (URI) and/or a Uniform Resource Locator (URL). For instance, in some examples, the MPS 100 can stream, download, or otherwise obtain data from a URI or a URL corresponding to the received media content.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the environment 101 (FIG. 1A).

In some implementations, the various playback devices 110, NMDs 120, and/or control devices 130 may be communicatively coupled to at least one remote computing device associated with a voice assistant service ("VAS") and/or at least one remote computing device associated with a media content service ("MCS"). For instance, in the illustrated example of FIG. 1B, remote computing devices 106a are associated with a VAS 190 and remote computing devices 106b are associated with an MCS 192. Although only a single VAS 190 and a single MCS 192 are shown in the example of FIG. 1B for purposes of clarity, the MPS 100 may be coupled to any number of different VASes and/or MCSes. In some embodiments, the various playback devices 110, NMDs 120, and/or control devices 130 may transmit data associated with a received voice input to a VAS configured to (i) process the received voice input data and (ii) transmit a corresponding command to the MPS 100. In some aspects, for example, the computing devices 106a may comprise one or more modules and/or servers of a VAS. In some implementations, VASes may be operated by one or more of SONOS®, AMAZON®, GOOGLE® APPLE®, MICROSOFT®, NUANCE®, or other voice assistant providers. In some implementations, MCSes may be operated by one or more of SPOTIFY, PANDORA, AMAZON MUSIC, YOUTUBE MUSIC, APPLE MUSIC, GOOGLE PLAY, or other media content services.

In some embodiments, the local network 160 comprises a dedicated communication network that the MPS 100 uses to transmit messages between individual devices and/or to transmit media content to and from MCSes. In certain embodiments, the local network 160 is configured to be accessible only to devices in the MPS 100, thereby reducing interference and competition with other household devices. In other embodiments, however, the local network 160 comprises an existing household communication network (e.g., a household WIFI network). In some embodiments, the MPS 100 is implemented without the local network 160, and the various devices comprising the MPS 100 can communicate with each other, for example, via one or more direct connections, PANs, telecommunication networks (e.g., an LTE network or a 5G network, etc.), and/or other suitable communication links.

In some embodiments, audio content sources may be regularly added and/or removed from the MPS 100. In some embodiments, for example, the MPS 100 performs an indexing of media items when one or more media content sources are updated, added to, and/or removed from the MPS 100. The MPS 100 can scan identifiable media items in some or all folders and/or directories accessible to the various playback devices and generate or update a media content database comprising metadata (e.g., title, artist, album, track length) and other associated information (e.g., URIs, URLs) for each identifiable media item found. In some embodiments, for example, the media content database is stored on one or more of the various playback devices, network microphone devices, and/or control devices of MPS 100.

As further shown in FIG. 1B, the remote computing devices 106 further include remote computing device(s) 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 110 may take the form of or include an on-board (e.g., integrated) network microphone device configured to receive sound, including voice utterances from a user. For example, the playback devices 110c-110h, and 110k include or are otherwise equipped with corresponding NMDs 120c-120h, and 120k, respectively. A playback device that includes or is equipped with an NMD may be referred to herein interchangeably as a playback device or an NMD unless indicated otherwise in the description. In some cases, one or more of the NMDs 120 may be a stand-alone device. For example, the NMD 1201 (FIG. 1A) may be a stand-alone device. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 110 and 120 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 110e because it is physically situated on a bookcase. Similarly, the NMD 120l may be assigned the named "Island" because it is physically situated on an island countertop in the Kitchen 101h (FIG. 1A). Some playback devices may be assigned names according to a zone or room, such as the playback devices 110g, 110d, and 110f, which are named "Bedroom," "Dining Room," and "Office," respectively. Further, certain playback devices may have functionally descriptive names. For example, the playback devices 110k and 110h are assigned the names "Right" and "Front," respectively, because these two devices are configured to provide specific audio channels during media playback in the zone of the Den 101d (FIG. 1A). The playback device 110c in the Patio may be named "Portable" because it is battery-powered and/or readily transportable to different areas of the environment 101. Other naming conventions are possible.

As discussed above, an NMD may detect and process sound from its environment, including audio output played by itself, played by other devices in the environment 101, and/or sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word (also referred to herein as an activation word) associated with a particular VAS.

In the illustrated example of FIG. 1B, the NMDs 120 are configured to interact with the VAS 190 over the local network 160 and/or the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 105, 110, 120, and 130 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. Pat. No. 10,499,146, issued Nov. 13, 2019, and titled "Voice Control of a Media Playback System," which is herein incorporated by reference in its entirety.

Upon receiving the stream of sound data, the VAS 190 may determine if there is voice input in the streamed data from the NMD, and if so the VAS 190 may also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude" by The Beatles), and that MCS 192, in turn, provides (e.g., streams) this content directly to the NIPS 100 or indirectly via the VAS 190. In some implementations, the VAS 190 may transmit to the NIPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 110e in the environment 101 (FIG. 1A) is in relatively close proximity to the NMD-equipped Living Room playback device 120b, and both devices 110e and 120b may at least sometimes detect the same sound. In such cases, this may require arbitration as to which device is ultimately responsible for providing detected-sound data to the remote VAS. Examples of arbitrating between NMDs may be found, for example, in previously referenced U.S. Pat. No. 10,499,146.

In certain implementations, an NMD may be assigned to, or otherwise associated with, a designated or default playback device that may not include an NMD. For example, the Island NMD 120l in the Kitchen 101h (FIG. 1A) may be assigned to the Dining Room playback device 110d, which is in relatively close proximity to the Island NMD 120l. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Pat. No. 10,499,146.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback devices 110, network microphone devices 120, and/or control devices 130. For example, the technologies herein may be utilized within an environment having a single playback device 110 and/or a single NMD 120. In some examples of such cases, the local network 160 (FIG. 1B) may be eliminated and the single playback device 110 and/or the single NMD 120 may communicate directly with the remote computing devices 106a-c. In some embodiments, a telecommunication network (e.g., an LTE network, a 5G network, etc.) may communicate with the various playback devices 110, network microphone devices 120, and/or control devices 130 independent of the local network 160.

b. Suitable Playback Devices

Figure 1C:
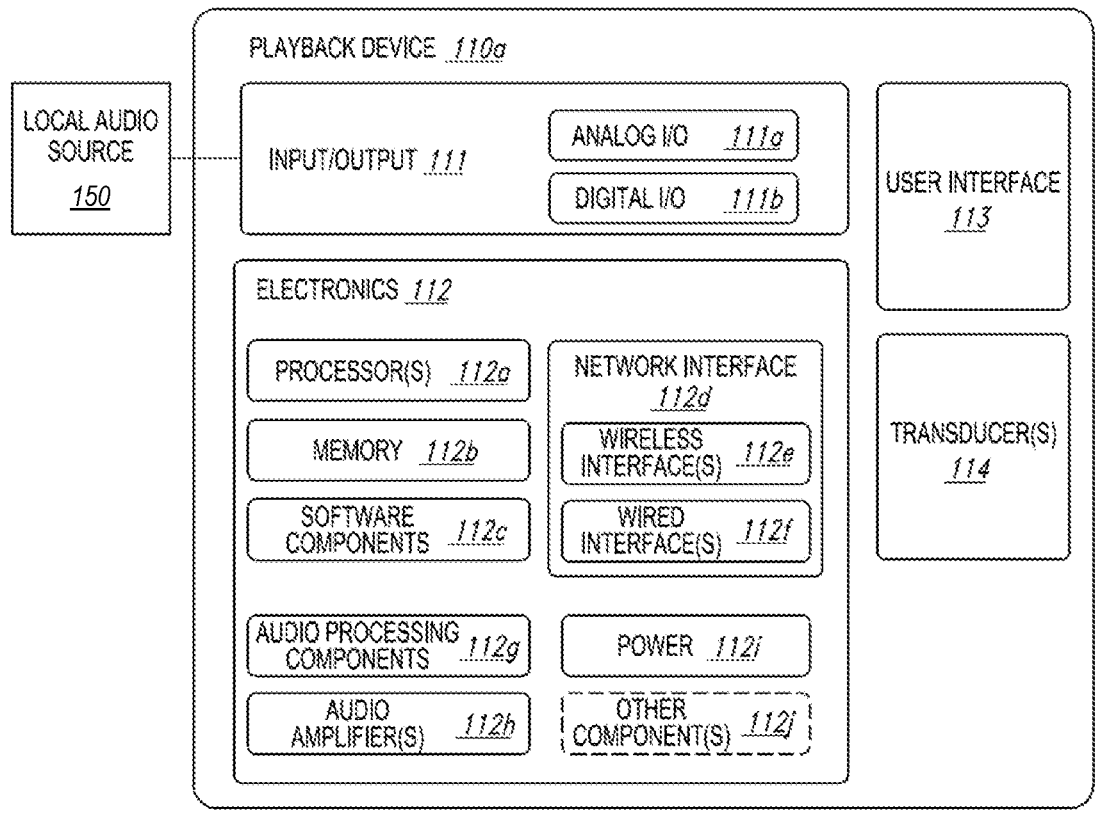
FIG. 1C is a block diagram of an example playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises a High-Definition Multimedia Interface (HDMI) interface and/or cable. In some embodiments, the digital I/O 111b includes one or more wireless communication links comprising, for example, a radio frequency (RF), infrared, WIFI, BLUETOOTH, or another suitable communication protocol. In certain embodiments, the analog I/O 111a and the digital I/O 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 150 via the input/output 111 (e.g., a cable, a wire, a PAN, a BLUETOOTH connection, an ad hoc wired or wireless communication network, and/or another suitable communication link). The local audio source 150 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 150 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 150. In other embodiments, however, the media playback system omits the local audio source 150 altogether. In some embodiments, the playback device 110a does not include an input/output 111 and receives all audio content via the local network 160.

The playback device 110a further comprises electronics 112, a user interface 113 (e.g., one or more buttons, knobs, dials, touch-sensitive surfaces, displays, touchscreens), and one or more transducers 114 (e.g., a driver), referred to hereinafter as "the transducers 114." The electronics 112 is configured to receive audio from an audio source (e.g., the local audio source 150) via the input/output 111, one or more of the computing devices 106a-c via the local network 160 (FIG. 1B), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input, which will be discussed in more detail further below with respect to FIGS. 1F and 1G.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (also referred to herein as "the audio components 112g"), one or more audio amplifiers 112h (referred to hereinafter as "the amplifiers 112h"), and power components 112i (e.g., one or more power supplies, power cables, power receptacles, batteries, induction coils, Power-over Ethernet (POE) interfaces, and/or other suitable sources of electric power).

In some embodiments, the electronics 112 optionally include one or more other components 112j (e.g., one or more sensors, video displays, touchscreens, battery charging bases). In some embodiments, the playback device 110a and electronics 112 may further include one or more voice processing components that are operable coupled to one or more microphones, and other components as described below with reference to FIGS. 1F and 1G.

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices and/or zones can be found, for example, in U.S. Pat. No. 8,234,395 entitled "System and method for synchronizing operations among a plurality of independently clocked digital data processing devices," which is herein incorporated by reference in its entirety.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the MPS 100. In some aspects, for example, the state data is shared during predetermined intervals of time (e.g., every 5 seconds, every 10 seconds, every 60 seconds) among at least a portion of the devices of the MPS 100, so that one or more of the devices have the most recent data associated with the MPS 100.

The network interface 112d is configured to facilitate a transmission of data between the playback device 110a and one or more other devices on a data network. The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the local network 160 (FIG. 1B) in accordance with a suitable wireless communication protocol (e.g., WIFI, BLUETOOTH, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio processing components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

In some implementations, the power components 112i of the playback device 110a may additionally include an internal power source (e.g., one or more batteries) configured to power the playback device 110a without a physical connection to an external power source. When equipped with the internal power source, the playback device 110a may operate independent of an external power source. In some such implementations, an external power source interface may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The user interface 113 may facilitate user interactions independent of or in conjunction with user interactions facilitated by one or more of the control devices 130 (FIG. 1A). In various embodiments, the user interface 113 includes one or more physical buttons and/or supports graphical interfaces provided on touch sensitive screen(s) and/or surface(s), among other possibilities, for a user to directly provide input. The user interface 113 may further include one or more light components (e.g., LEDs) and the speakers to provide visual and/or audio feedback to a user.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

In some embodiments, the playback device 110a may include a speaker interface for connecting the playback device to external speakers. In other embodiments, the playback device 110a may include an audio interface for connecting the playback device to an external audio amplifier or audio-visual receiver.

Figure 1D:
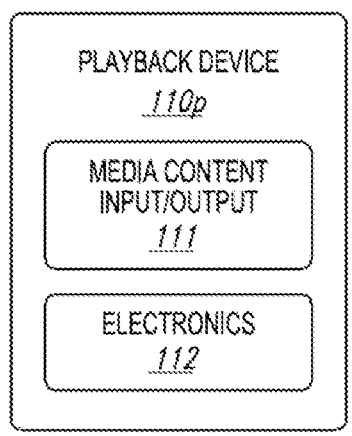
FIG. 1D is a block diagram of an example playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," "SUB," "ARC," "MOVE," and "ROAM." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device may omit a user interface and/or one or more transducers. For example, FIG. 1D is a block diagram of a playback device 110p comprising the input/output 111 and electronics 112 without the user interface 113 or transducers 114.

Figure 1E:
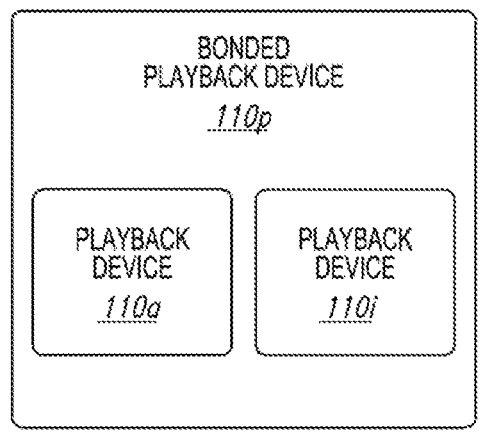
FIG. 1E is a block diagram of an example playback device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with playback device 110i, is configured to render only the mid-range and high frequency components of a particular audio content, while the playback device 110i renders the low frequency component of the particular audio content. In some embodiments, the bonded playback device 110q includes additional playback devices and/or another bonded playback device.

Figure 4:
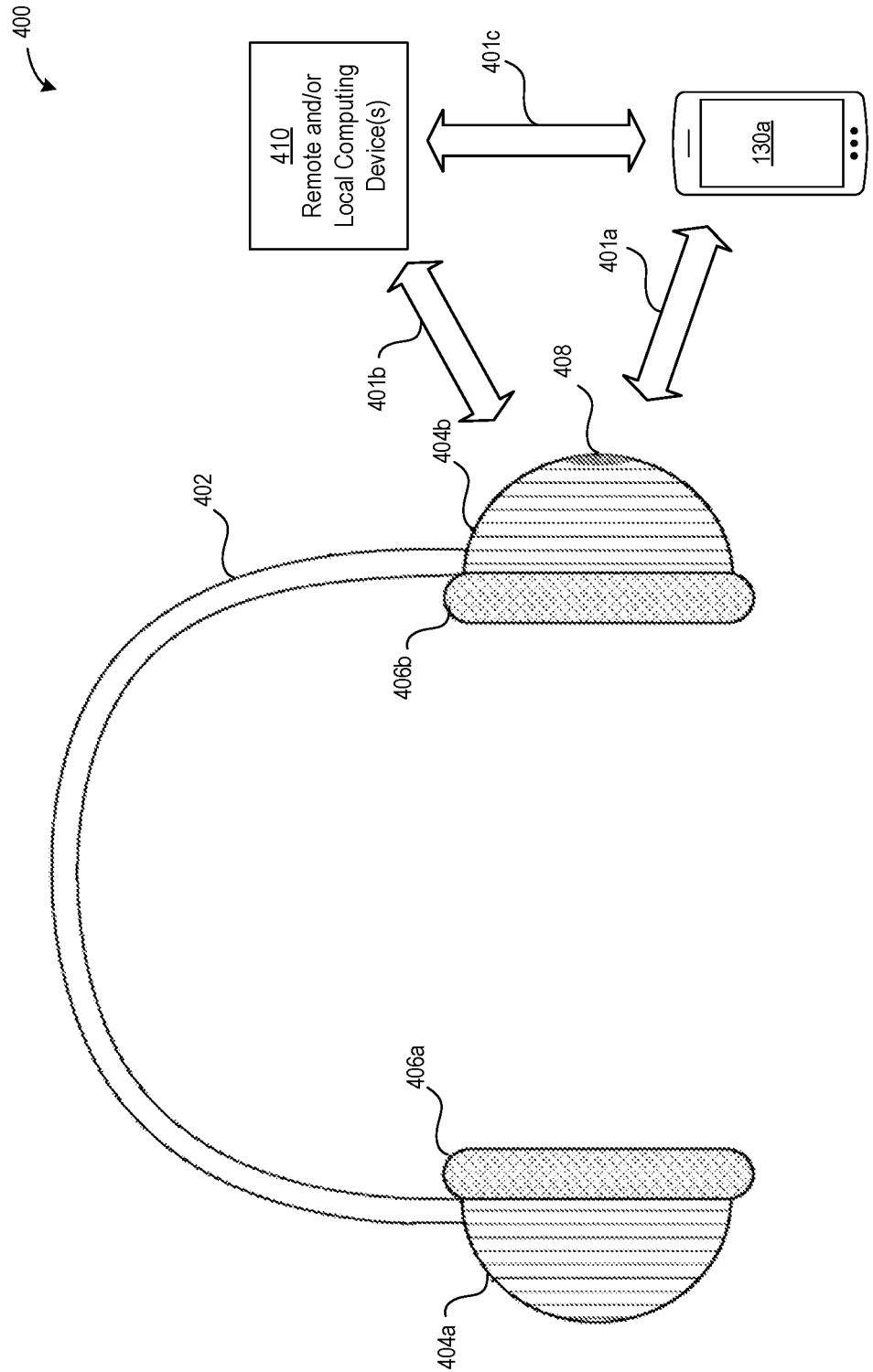
FIG. 4 is a diagram of an example headset assembly for the playback device of FIG. 3.

In some embodiments, one or more of the playback devices 110 may take the form of a wired and/or wireless headphone (e.g., an over-ear headset, an on-ear headset, or an in-ear headset). For instance, FIG. 4 shows an example headset assembly 400 ("headset 400") for such an implementation of one of the playback devices 110. As shown, the headset 400 includes a headband 402 that couples a first earcup 404a to a second earcup 404b. Each of the earcups 404a and 0244b may house any portion of the electronic components in the playback device 110, such as one or more speakers. Further, one or more of the earcups 404a and 404b may include a user interface for controlling audio playback, volume level, and other functions. The user interface may include any of a variety of control elements such as a physical button 408, a slider, a knob, and/or a touch control surface. As shown in FIG. 4, the headset 400 may further include ear cushions 406a and 406b that are coupled to ear cups 404a and 404b, respectively. The ear cushions 406a and 406b may provide a soft barrier between the head of a user and the earcups 404a and 404b, respectively, to improve user comfort and/or provide acoustic isolation from the ambient (e.g., passive noise reduction (PNR)).

As described in greater detail below, the electronic components of a playback device may include one or more network interface components (not shown in FIG. 4) to facilitate wireless communication over one more communication links. For instance, a playback device may communicate over a first communication link 401a (e.g., a BLUETOOTH link) with one of the control devices 130, such as the control device 130a, and/or over a second communication link 401b (e.g., a WIFI or cellular link) with one or more other computing devices 410 (e.g., a network router and/or a remote server). As another possibility, a playback device may communicate over multiple communication links, such as the first communication link 401a with the control device 130a and a third communication link 401c (e.g., a WIFI or cellular link) between the control device 130a and the one or more other computing devices 410. Thus, the control device 130a may function as an intermediary between the playback device and the one or more other computing devices 410, in some embodiments.

In some instances, the headphone device may take the form of a hearable device. Hearable devices may include those headphone devices (including ear-level devices) that are configured to provide a hearing enhancement function while also supporting playback of media content (e.g., streaming media content from a user device over a PAN, streaming media content from a streaming music service provider over a WLAN and/or a cellular network connection, etc.). In some instances, a hearable device may be implemented as an in-ear headphone device that is configured to playback an amplified version of at least some sounds detected from an external environment (e.g., all sound, select sounds such as human speech, etc.)

It should be appreciated that one or more of the playback devices 110 may take the form of other wearable devices separate and apart from a headphone device. Wearable devices may include those devices configured to be worn about a portion of a user (e.g., a head, a neck, a torso, an arm, a wrist, a finger, a leg, an ankle, etc.). For example, the playback devices 110 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

c. Suitable Network Microphone Devices (NMDs)

FIG. 1F is a block diagram of the NMD 120a (FIGS. 1A and 1B). The NMD 120a includes one or more voice processing components 124 (also referred to herein as "the voice components 124") and several components described with respect to the playback device 110a (FIG. 1C) including the processors 112a, the memory 112b, and the microphones 115. The NMD 120a optionally comprises other components also included in the playback device 110a (FIG.

1C), such as the user interface 113 and/or the transducers 114. In some embodiments, the NMD 120a is configured as a media playback device (e.g., one or more of the playback devices 110), and further includes, for example, one or more of the audio processing components 112g (FIG. 1C), the transducers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing components 124, and only a portion of the components of the electronics 112 described above with respect to FIG. 1C. In some aspects, for example, the NMD 120a includes the processor 112a and the memory 112b (FIG. 1C), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing components 124 (FIG. 1F). The microphones 115 are configured to detect sound (i.e., acoustic waves) in the environment of the playback device 110r, which may then be provided to voice processing components 124. More specifically, each microphone 115 is configured to detect sound and convert the sound into a digital or analog signal representative of the detected sound, which can then cause the voice processing component to perform various functions based on the detected sound, as described in greater detail below. In some implementations, the microphones 115 may be arranged as an array of microphones (e.g., an array of six microphones). In some implementations the playback device 110r may include fewer than six microphones or more than six microphones. The playback device 110r optionally includes an integrated control device 130c. The control device 130c can comprise, for example, a user interface configured to receive user input (e.g., touch input, voice input) without a separate control device. In other embodiments, however, the playback device 110r receives commands from another control device (e.g., the control device 130a of FIG. 1B).

In operation, the voice-processing components 124 are generally configured to detect and process sound received via the microphones 115, identify potential voice input in the detected sound, and extract detected-sound data to enable a VAS, such as the VAS 190 (FIG. 1B), to process voice input identified in the detected-sound data. The voice processing components 124 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 124 may include or otherwise take the form of one or more DSPs or one or more modules of a DSP. In this respect, certain voice processing components 124 may be configured with particular parameters (e.g., gain and/or spectral parameters) that may be modified or otherwise tuned to achieve particular functions. In some implementations, one or more of the voice processing components 124 may be a subcomponent of the processor 112a.

In some implementations, the voice-processing components 124 may detect and store a user's voice profile, which may be associated with a user account of the MPS 100. For example, voice profiles may be stored as and/or compared to variables stored in a set of command information or data table. The voice profile may include aspects of the tone of frequency of a user's voice and/or other unique aspects of the user's voice, such as those described in previously-referenced U.S. Pat. No. 10,499,146.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The NMD 120a may use the microphone data (or transmit the microphone data to another device) for calibrating the audio characteristics of one or more playback devices 110 in the MPS 100. As another example, one or more of the playback devices 110, NMDs 120, and/or control devices 130 of the MPS 100 may transmit audio tones (e.g., ultrasonic tones, infrasonic tones) that may be detectable by the microphones 115 of other devices, and which may convey information such as a proximity and/or identity of the transmitting device, a media playback system command, etc. As yet another example, the voice processing components 124 may receive and analyze the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Controller Devices

Figure 1H:
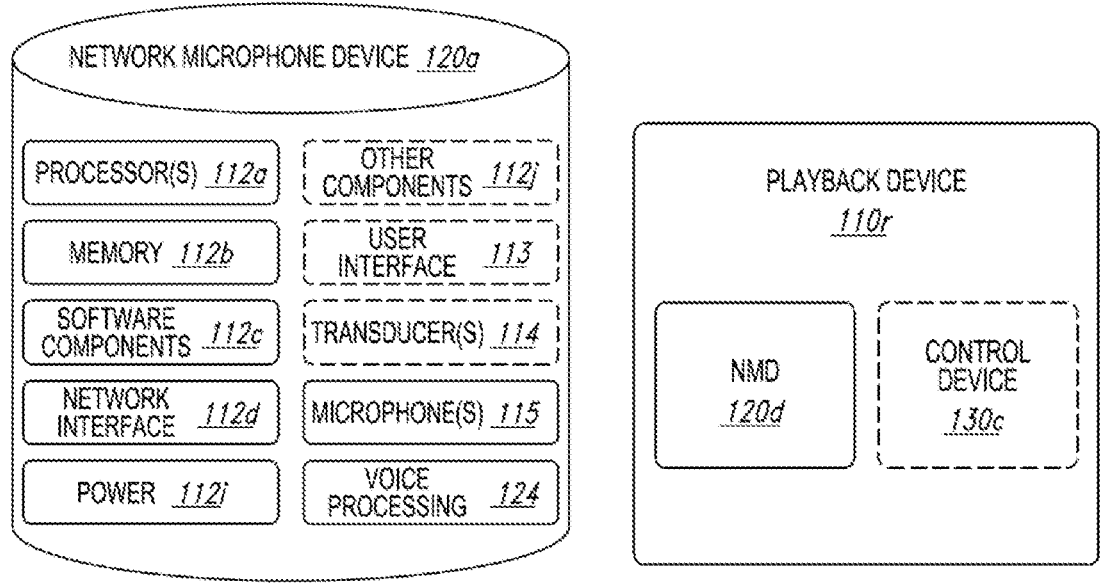
FIG. 1H is a partially schematic diagram of an example control device.
Figure 1H:
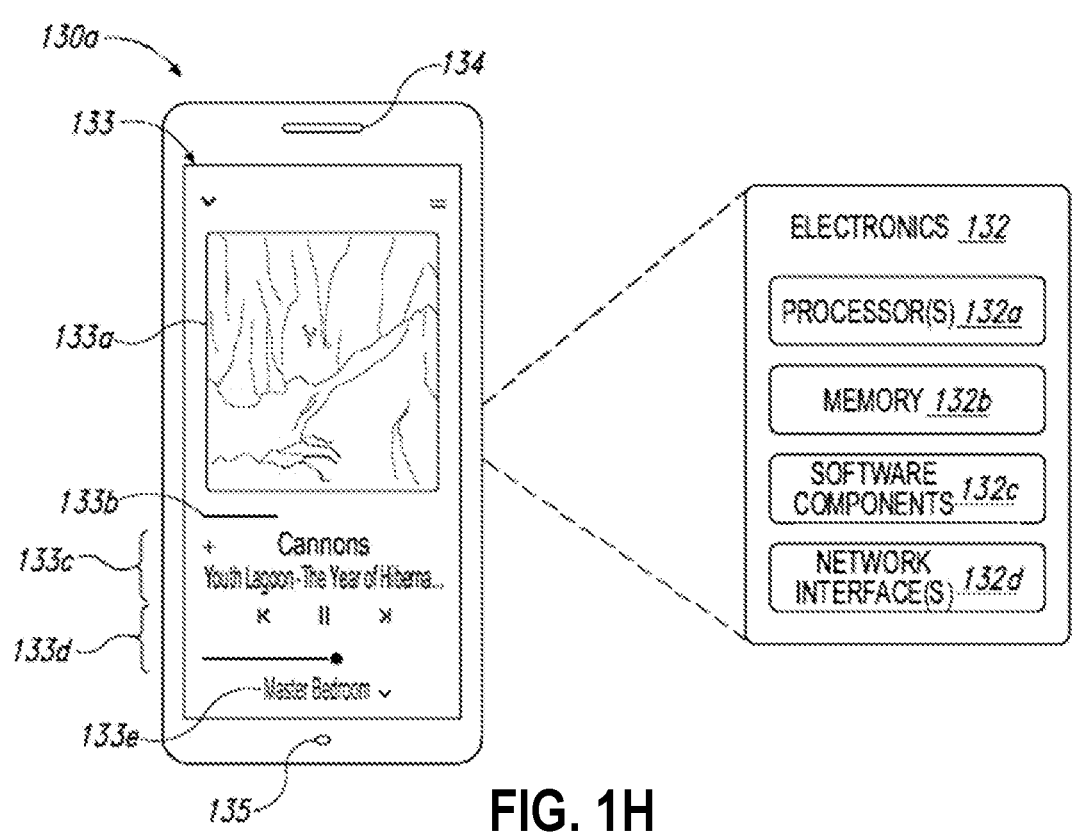

FIG. 1H is a partially schematic diagram of one example of the control device 130a (FIGS. 1A and 1B). As used herein, the term "control device" can be used interchangeably with "controller," "controller device," or "control system." Among other features, the control device 130a is configured to receive user input related to the MPS 100 and, in response, cause one or more devices in the MPS 100 to perform an action(s) and/or an operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the MPS 100. In other embodiments, as described above with respect to FIG. 1G, the control device 130a is integrated into another device in the MPS 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processor(s) 132a"), a memory 132b, software components 132c, and a network interface 132d. The processor(s) 132a can be configured to perform functions relevant to facilitating user access, control, and configuration of the MPS 100. The memory 132b can comprise data storage that can be loaded with one or more of the software components executable by the processor(s) 132a to perform those functions. The software components 132c can comprise applications and/or other executable software configured to facilitate control of the MPS 100. The memory 132b can be configured to store, for example, the software components 132c, media playback system controller application software, and/or other data associated with the MPS 100 and the user.

The network interface 132d is configured to facilitate network communications between the control device 130a and one or more other devices in the MPS 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.12, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 130a to one or more of the playback devices 110. The network interface 132d can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among other changes. Additional description of zones and groups can be found below with respect to FIGS. 1J through 2.

Figure 1I:
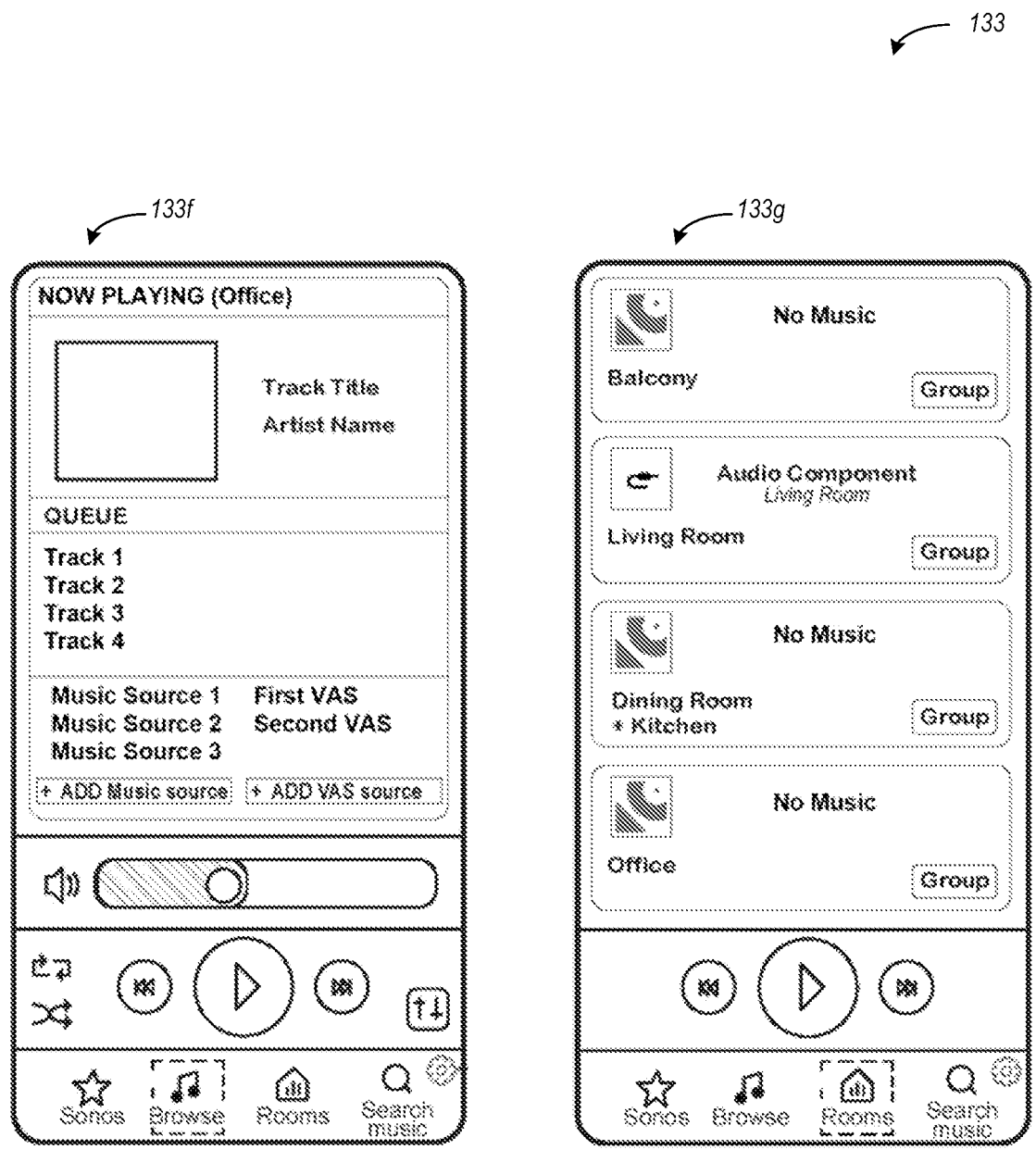
FIG. 1I is a schematic diagram of example user interfaces of the example control device of FIG. 1H.

The user interface 133 is configured to receive user input and can facilitate control of the MPS 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone, etc.). In some embodiments, however, user interfaces of varying formats, styles, and interactive sequences may alternatively be implemented on one or more network devices to provide comparable control access to a media playback system. FIG. 1I shows two additional example user interface displays 133f and 133g of user interface 133. Additional examples are also possible.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device, etc.) comprising a portion of the electronics 132 and the user interface 133 (e.g., a touch screen) without any speakers or microphones.

e. Suitable Playback Device Configurations

Figure 1J:
FIGS. 1J, 1K, 1L, and 1M are schematic diagrams of example corresponding media playback system zones.
Figure 1K:
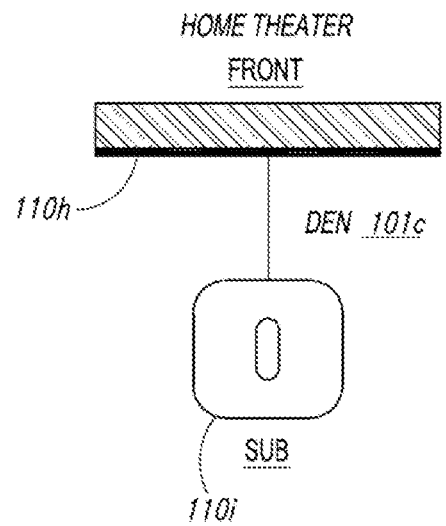
Figure 1L:
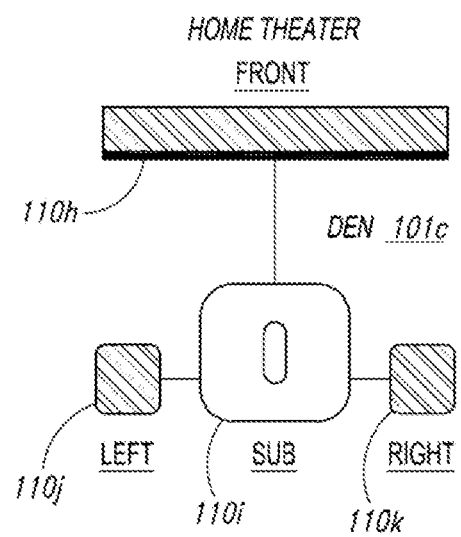
Figure 1M:
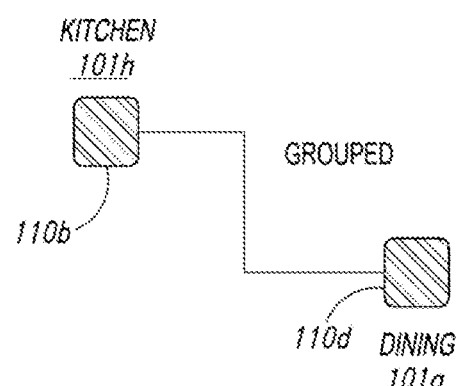
Figure 2:
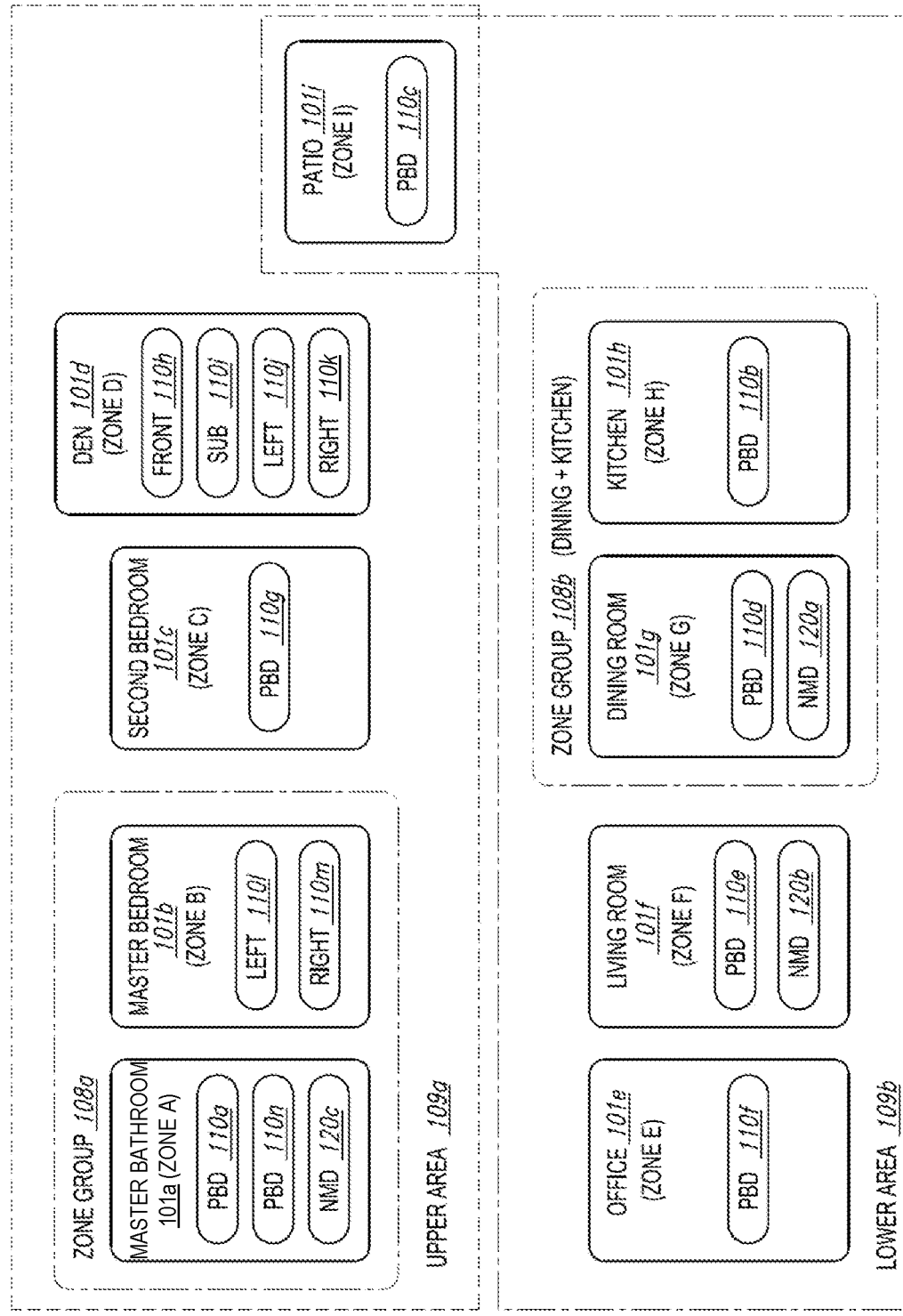
FIG. 2 is a schematic diagram of example media playback system areas.

FIGS. 1J, 1K, 1L, 1M, and 2 show example configurations of playback devices in zones and zone groups. Referring first to FIG. 2, in one example, a single playback device may belong to a zone. For example, the playback device 110g in the Second Bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110m (e.g., a right playback device) to form Zone B. Bonded playback devices may have different playback responsibilities (e.g., channel responsibilities), as will be described in more detail further below. In other implementations, multiple playback devices may be merged to form a single zone. As one example, the playback device 110a can be bonded to the playback device 110n and the NMD 120c to form Zone A. As another example, the playback device 110h (e.g., a front playback device) may be merged with the playback device 110i (e.g., a subwoofer), and the playback devices 110j and 110k (e.g., left and right surround speakers, respectively) to form a single Zone D. In yet other implementations, one or more playback zones can be merged to form a zone group (which may also be referred to herein as a merged group). As one example, the playback zones Zone A and Zone B can be merged to form Zone Group 108a. As another example, the playback zones Zone G and Zone H can be merged to form Zone Group 108b. The merged playback zones Zone G and Zone H may not be specifically assigned different playback responsibilities. That is, the merged playback zones Zone G and Zone H may, aside from playing audio content in synchrony, each play audio content as they would if they were not merged and operating as independent zones.

Each zone in the MPS 100 may be provided for control as a single user interface (UI) entity represented in the UI. For example, Zone A may be provided as a single entity named Master Bathroom. Zone B may be provided as a single entity named Master Bedroom. Zone C may be provided as a single entity named Second Bedroom.

In some implementations, as mentioned above playback devices that are bonded may have different playback responsibilities, such as responsibilities for certain audio channels. For example, as shown in FIG. 1J, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1K, the playback device 110h named Front may be bonded with the playback device 110i named SUB. The Front device 110h can be configured to render a range of mid to high frequencies and the SUB device 110i can be configured to render low frequencies. When unbonded, however, the Front device 110h can be configured to render a full range of frequencies. As another example, FIG. 1L shows the Front and SUB devices 110h and 110i further bonded with Left and Right playback devices 110j and 110k, respectively. In some implementations, the Right and Left devices 110j and 110k can be configured to form surround or "satellite" channels of a home theater system. The bonded playback devices 110h, 110i, 110j, and 110k may form a single Zone D (FIG. 2).

In other implementations, playback devices that are merged may not have assigned playback responsibilities and may each render the full range of audio content of which the respective playback device is capable of. Nevertheless, merged devices may be represented as a single UI entity (i.e., a zone, as discussed above). For instance, the playback devices 110a and 110n in the Master Bathroom have the single UI entity of Zone A. In one embodiment, the playback devices 110a and 110n may each output the full range of audio content of which each respective playback devices 110a and 110n is capable, in synchrony.

In some embodiments, an NMD may be bonded or merged with one or more other devices so as to form a zone. As one example, the NMD 120c may be merged with the playback devices 110a and 110n to form Zone A. As another example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. Pat. No. 10,499,146.

As mentioned above, in some implementations, zones of individual, bonded, and/or merged devices may be grouped to form a zone group. For example, referring to FIG. 1N, Zone A may be grouped with Zone B to form a zone group 108a that includes the two zones, and Zone G may be grouped with Zone H to form the zone group 108b. However, other zone groupings are also possible. For example, Zone A may be grouped with one or more other Zones C-I. The Zones A-I may be grouped and ungrouped in numerous ways. For example, three, four, five, or more (e.g., all) of the Zones A-I may be grouped at any given time. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio content.

In various implementations, the zone groups in an environment may be named by according to a name of a zone within the group or a combination of the names of the zones within a zone group. For example, Zone Group 108b can be assigned a name such as "Dining+Kitchen", as shown in FIG. 2. In other implementations, a zone group may be given a unique name selected by a user.

Certain data may be stored in a memory of a playback device (e.g., the memory 112c of FIG. 1C) as one or more state variables that are periodically updated and used to describe the state of a playback zone, the playback device(s), and/or a zone group associated therewith. The memory may also include the data associated with the state of the other devices of the media system and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the Second Bedroom 101c may indicate (i) that the playback device 110g is the only playback device of the Zone C and (ii) that Zone C is not in a zone group. Identifiers associated with the Den 101d may indicate that the Den 101d is not grouped with other zones but includes bonded playback devices 110h-110k. Identifiers associated with the Dining Room 101g may indicate that the Dining Room 101g is part of the Dining+Kitchen Zone Group 108b and that devices 110d and 110b (Kitchen 101h) are grouped (FIG. 1M). Identifiers associated with the Kitchen 101h may indicate the same or similar information by virtue of the Kitchen 101h being part of the Dining+

Kitchen Zone Group 108b. Other example zone variables and identifiers are described below.

In yet another example, the MPS 100 may include variables or identifiers representing other associations of zones and zone groups, such as identifiers associated with Areas, as shown in FIG. 2. An area may involve a cluster of zone groups and/or zones not within a zone group. For instance, FIG. 2 shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. Pat. No. 10,712,997 filed Aug. 21, 2017, issued Jul. 14, 2020, and titled "Room Association Based on Name," and U.S. Pat. No. 8,483,853, filed Sep. 11, 2007, issued Jul. 9, 2013, and titled "Controlling and manipulating groupings in a multi-zone media system." Each of these applications is incorporated herein by reference in its entirety. In some embodiments, the MPS 100 may not implement Areas, in which case the system may not store variables associated with Areas.

Figure 3:
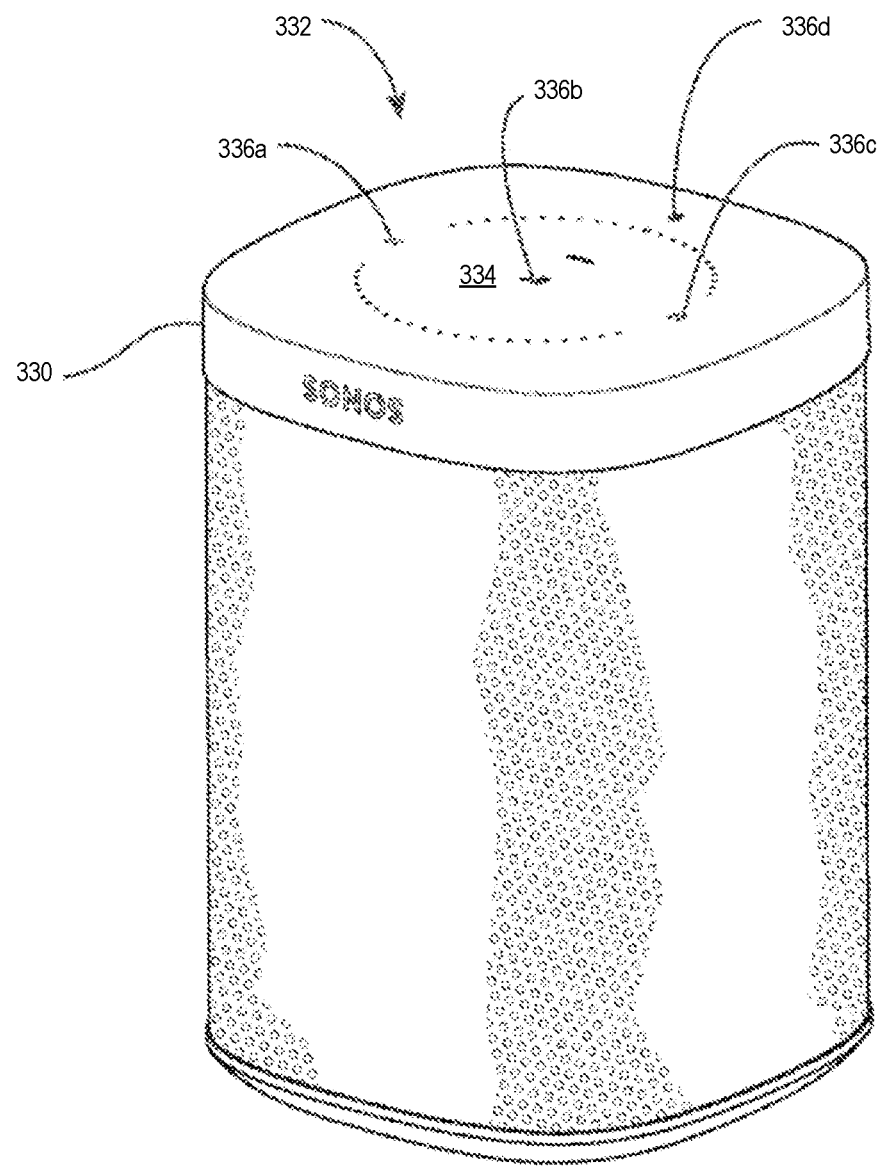
FIG. 3 is an isometric diagram of an example playback device housing.

FIG. 3 shows an example housing 330 of the playback device 110 that includes a user interface in the form of a control area 332 at a top portion 334 of the housing 330. The control area 332 includes buttons 336a, 336b, and 336c for controlling audio playback, volume level, and other functions. The control area 332 also includes a button 336d for toggling one or more microphones (not visible in FIG. 3) of the playback device 110 to either an on state or an off state. The control area 332 is at least partially surrounded by apertures formed in the top portion 334 of the housing 330 through which the microphones receive the sound in the environment of the playback device 110. The microphones may be arranged in various positions along and/or within the top portion 334 or other areas of the housing 330 so as to detect sound from one or more directions relative to the playback device 110.

In some embodiments, the playback device 110 may take the form of a wired and/or wireless headphone (e.g., an over-ear headset, an on-ear headset, or an in-ear headset). For instance, FIG. 4 shows an example headset assembly 400 ("headset 400") for such an implementation of the playback device 110. As shown, the headset 400 includes a headband 402 that couples a first earcup 404a to a second earcup 404b. Each of the earcups 404a and 404b may house any portion of the electronic components in the playback device 110, such as one or more speakers. Further, one or more of the earcups 404a and 404b may include a user interface for controlling audio playback, volume level, and other functions. The user interface may include any of a variety of control elements such as a physical button 408, a slider, a knob, and/or a touch control surface. As shown in FIG. 4, the headset 400 may further include ear cushions 406a and 406b that are coupled to ear cups 404a and 404b, respectively. The ear cushions 406a and 406b may provide a soft barrier between the head of a user and the earcups 404a and 404b, respectively, to improve user comfort and/or provide acoustic isolation from the ambient (e.g., passive noise reduction (PNR)).

f. Audio Content

Audio content may be any type of audio content now known or later developed. For example, in some embodiments, the audio content includes any one or more of: (i) streaming music or other audio obtained from a streaming media service, such as Spotify, Pandora, or other streaming media services; (ii) streaming music or other audio from a local music library, such as a music library stored on a user's laptop computer, desktop computer, smartphone, tablet, home server, or other computing device now known or later developed; (iii) audio content associated with video content, such as audio associated with a television program or movie received from any of a television, set-top box, Digital Video Recorder, Digital Video Disc player, streaming video service, or any other source of audio-visual media content now known or later developed; (iv) text-to-speech or other audible content from a voice assistant service (VAS), such as Amazon Alexa or other VAS services now known or later developed; (v) audio content from a doorbell or intercom system such as Nest, Ring, or other doorbells or intercom systems now known or later developed; and/or (vi) audio content from a telephone, video phone, video/teleconferencing system or other application configured to allow users to communicate with each other via audio and/or video.

In operation, a "sourcing" playback device obtains any of the aforementioned types of audio content from an audio source via an interface on the playback device, e.g., one of the sourcing playback device's network interfaces, a "line-in" analog interface, a digital audio interface, or any other interface suitable for receiving audio content in digital or analog format now known or later developed.

An audio source is any system, device, or application that generates, provides, or otherwise makes available any of the aforementioned audio content to a playback device. For example, in some embodiments, an audio source includes any one or more of a streaming media (audio, video) service, digital media server or other computing system, VAS service, television, cable set-top-box, streaming media player (e.g., AppleTV, Roku, gaming console), CD/DVD player, doorbell, intercom, telephone, tablet, or any other source of digital audio content.

A playback device that receives or otherwise obtains audio content from an audio source for playback and/or distribution to other playback devices may be referred to herein as the "sourcing" playback device, "master" playback device, or "group coordinator." One function of the "sourcing" playback device is to process received audio content for playback and/or distribution to other playback devices. In some embodiments, the sourcing playback device transmits the processed audio content to all the playback devices that are configured to play the audio content. In some embodiments, the sourcing playback device transmits the processed audio content to a multicast network address, and all the other playback devices configured to play the audio content receive the audio content via that multicast address. In some embodiments, the sourcing playback device alternatively transmits the processed audio content to each unicast network address of each other playback device configured to play the audio content, and each of the other playback devices configured to play the audio content receive the audio content via its unicast address.

III. Example Techniques for Creating Sound and Light Experiences

As mentioned above, sound can create and/or support different listening experiences and foster a more personal, meaningful, and targeted interaction with one's environment. Listening experiences can be further enhanced by corresponding lighting experiences to create more immersive audiovisual experiences. Accordingly, disclosed herein are various modes of operation, techniques, and embodiments for producing light experiences based on sound.

a. Light Source

In general, a "light source" as used herein may refer to any artificial lighting element that is capable of providing light. Nonlimiting examples of a lighting element may include a light bulb, a light emitting diode ("LED"), an LED panel, matrix, array, or some other grouping of LEDs, a lamp, a projector, and a television. A light source may also be, for example, a set of one or more smart light devices or a smart light system (e.g., PHILIPS HUE® smart light system) that can communicate with the at least one playback device of a media playback system to produce a visual output. A light source may include other examples as well. A light source may also be referred to herein as a lighting device or a lighting element.

Light sources may produce various types of lighting experiences. As one example, the term "lighting effect" or "light effect" as used herein may refer to a lighting experience that creates a particular ambience by causing one or more light sources to produce a given color and/or brightness level. As another example, the term "lighting scene" or "light scene" as used herein may refer to a lighting experience that creates a visual scene by causing one or more light sources to produce light that mimics a particular scene, such as ocean waves, sunrise or sunset, the northern lights, underwater, among other possibilities. As yet another example, the term "animation" as used herein may refer to a lighting experience that creates high fidelity graphics by causing one or more light sources to produce light that collectively forms specific shapes, images, and/or patterns. As will be explained in more detail further below, animations may be created dynamically (e.g., smart animations) or based on a predefined set of selectable animation options including colors, shapes, images, and/or patterns. The predefined set of animation options may be available to a user in the form of a software tool for designing a predetermined audiovisual experience that is displayed via a graphical user interface ("GUI") on a controller device that is communicatively coupled to a playback device that is configured to communicate with one or more light source to create a lighting experience. Using the GUI, the user may select, for given audio content, corresponding animation options and indicate when each animation option should occur with respect to the given audio content. For example, the user may drag animation options from an option panel and drop the animation options at desired times within a graphical display of the given audio content. The user may additionally preview the audiovisual experience via the GUI and make additional modifications as desired. In this way, a lighting experience can be designed and customized with respect to given audio content, for both personal and public use (e.g., a concert or other performance event). Further, the user may interact with the GUI generally to adjust one or more aspects of lighting experiences as described herein, such as to modify the intensity and/or the sensitivity of a lighting effect, scene, and/or animation.

In general, producing light to create a given lighting experience may be referred to herein as "lighting behavior" or "light behavior."

The type of light source(s) may dictate the type of lighting experience that may be produced. For instance, some light sources—such as light bulbs, lamps, or light strips, etc.—may not have the ability to produce high fidelity lighting output such as specific shapes or images and may thus be used to create a lighting effect and/or a lighting scene, whereas some light sources—such as an LED assembly—may have the ability to produce high fidelity lighting output and may thus be used to create any type of lighting experience, including a lighting effect, a lighting scene, and an animation. Further, each type of lighting experience may additionally incorporate lighting transitions such that the one or more light sources may begin and/or cease producing light at a given time in order to create the desired lighting experience.

b. Example System Configuration

A media playback system that may implement the modes, operations, and techniques to create sound and lighting experiences as disclosed herein may take various forms. As one example, the media playback system may take the form of MPS 100 described above that is configured to communicate with and/or is integrated with a lighting system that comprises one or more lighting devices (e.g., a third-party lighting system such as the PHILIPS HUE® smart light system). As another possibility, the media playback system may comprise at least one playback device that is configured to communicate with at least one light source over at least one data network. Further, the at least one playback device and at least one light source may be bonded so as to produce audio and lighting in coordination with each other. In this regard, the playback device and the light source may be configured to communicate via a local area network (e.g., WiFi, Bluetooth, etc.) or via a wide area network (e.g., a cloud network). In some implementations, each of the at least one playback device and the at least one light source may be configured to communicate via their respective cloud networks. For example, the at least one playback device may be configured to send a command comprising a lighting instruction to a first remote computing device, which may then transmit the command to a second remote computing device that is configured to communicate with the at least one light source. As another possibility, the media playback system may comprise at least one playback device that bodily incorporates a light source. Such a playback device may take the form of a table lamp speaker or a lightbulb speaker, among other possibilities. As yet another possibility, the media playback system may comprise a combination of playback devices without incorporated light sources and playback devices with incorporated light sources. Other system configurations are also possible.

Disclosed herein are various embodiments and techniques for providing light experiences based on sound. In this regard, the sound may be sound that is detected or sound that is outputted by a playback device of a media playback system, such as the MPS 100 discussed above with respect to FIG. 1A, that is configured to communicate with one or more lighting devices. Sound that is detected may comprise a voice input (e.g., a voice input comprising a command to play audio content) and/or ambient sound (e.g., people talking, running water, etc.) that is detected via a microphone of the playback device, and sound that is outputted may comprise audio content that is played back by the playback device (e.g., music, podcast, movie soundtrack, etc.).

c. Lighting Behavior Based on Audio Frequencies

In one aspect, lighting behavior may be based on different frequencies of the audio spectrum, which is referred to herein as the range of frequencies audible to humans. A playback device that is configured to communicate with at least one lighting device may analyze given audio content to identify frequency ranges present in the given audio content and monitor audio activity in the given audio content. Then, based on the identified frequency ranges and/or the monitored audio activity, the playback device may determine lighting behavior that is to be implemented by the lighting device(s) and then cause the lighting device(s) to implement the determined lighting behavior.

The playback device may analyze the given audio content based on detecting the audio content via a microphone of the playback device (e.g., while playing back the given audio content), based on information about the given audio content that is received over a data network (e.g., received over a WAN from a remote computing device or over a wireless LAN from another device of the media playback system), or a combination of the two. Further, the frequency ranges that are present in the audio content may be identified using an algorithm, such as a Fast Fourier transform to convert the audio content from the time domain to the frequency domain to identify frequencies present in the audio content. For instance, the audio spectrum, which spans 20 Hz to 20 kHz, is broken down generally into low frequencies (approximately 20-300 Hz), medium frequencies (approximately 300 Hz to 5 kHz), and high frequencies (approximately 5-20 kHz) and more specifically into seven primary frequency bands: (i) sub-bass (~20-60 Hz), (ii) bass (~60-250 Hz), (iii) low midrange (~250-500 Hz), (iv) midrange (~500 Hz-2 kHz), (v) upper midrange (~2-4 kHz), (vi) presence (~4-6 kHz), and (vii) brilliance (~6-20 kHz). Based on analyzing the given audio content (e.g., Fast Fourier analysis), the playback device may identify one or more frequency ranges present in the given audio content, including the fundamental frequency of the given audio content.

The playback device may then associate each identified frequency range with a given lighting experience (e.g., a given lighting effect, scene, and/or animation) that is to be produced by the at least one lighting device. In this regard, the playback device may use a lighting algorithm to facilitate association of a given frequency range with given lighting behavior. As one possibility, the lighting algorithm may dynamically associate each identified frequency range with a given lighting behavior as the frequency range is identified. The given lighting behavior may be selected from a set of one or more lighting behaviors that may be based on the capability of the lighting device(s) with which the playback device is configured to communicate. The given lighting behavior may be selected randomly or based on a given order, such as sequentially or alphabetically. For instance, information about the lighting device(s) (which may be received by the playback device from the lighting device(s), from a remote computing device associated with the lighting device(s), or based on user input provided via a controller device communicatively coupled to the playback device), may indicate a set of one or more available lighting behaviors based on the capabilities of the lighting device(s). For example, if the lighting device(s) comprises a smart light bulb, the set of one or more available lighting behaviors may comprise lighting effects that the smart light bulb is capable of producing, which may include a given set of colors and brightness levels. As another example, if the lighting device(s) comprises an LED panel, the set of one or more available lighting behaviors may comprise lighting animations that the LED panel is capable of producing, which may include a given set of shapes, images, and/or patterns. As the playback device identifies frequency ranges in the given audio content, the playback device may associate each frequency range with a given lighting behavior. Further, the playback device may transmit a message to the lighting device(s) that includes (i) an instruction to implement the given lighting behavior and (ii) timing information regarding when to implement the given lighting behavior.

As another possibility, the lighting algorithm may associate each identified frequency range with given lighting behavior based on a predetermined selection of corresponding sets of frequency range and lighting behavior. For instance, via a controller device that is communicatively coupled to the playback device, a user may have defined given lighting behavior for each possible frequency range, such as a first lighting effect for a first frequency range, a second lighting effect for a second frequency range, a given animation for a third frequency range, and a given scene for a fourth frequency range. When the playback device identifies a given frequency range, it may associate the given frequency range with its corresponding given lighting behavior as indicated by the predetermined selection. In some instances where the given audio content is to be played back in a loop, given lighting behavior may specified such that the lighting behavior is also produced in a loop corresponding with the looped audio content. Other examples are also possible.

Furthermore, the playback device may monitor audio activity within each identified frequency range and then associate given audio activity with a given lighting behavior. For instance, a given frequency range may include one or more lines (i.e., a melodic statement), that may be human vocals and/or instrumental. Each line may be associated with a given lighting behavior. In some instances, a given line may comprise more than one vocals or instruments. In such instances, the given lighting behavior may reflect the vocals or instruments visually by associating different lighting characteristics for each distinct vocal or instrument. For example, the lighting behavior may include an animation of a single shape in different colors that represent each distinct vocal or instrument, or a single shape with multiple points that represent each distinct vocal or instrument, or distinct patterns that represent each distinct vocal or instrument. Other examples are also possible.

In some implementations, the playback device may associate each frequency of visible light with a given ambient sound that has been detected by the playback device, and upon detecting the given ambient sound, cause the light source to produce a lighting effect that corresponds with the associated frequency. For example, the playback device may associate the color yellow with the sound of birds chirping and the color green with the sound of a lawnmower. Thereafter, whenever the playback device detects the sound of birds chirping or the sound of the lawnmower, the playback device may cause the light source to produce a lighting effect that displays the color yellow and the color green, respectively. Other examples are also possible.

Still, in some implementations, the playback device may cause the light source to perform given lighting behavior based on data-over-sound transmissions comprising one or more commands. For instance, the playback device may receive from a computing device (e.g., a smartphone, a tablet, a laptop, another playback device, or any other device that includes a speaker, etc.) an ultrasonic or near-ultrasonic sound signal (e.g., 19-20 kHz or higher) that comprises data indicating a command for given lighting behavior. The playback device, upon receiving the sound signal, may decode the data indicating the command and then cause the light source to perform lighting behavior based on the command. In this way, the playback device may cause the light source to engage in lighting behavior independent of or in addition to frequency band-associated lighting behavior as described above and/or sound that is audible to users in proximity of the playback device and/or the light source. Additional information about transmitting data using sound can be found in U.S. Pub. No. 2019/0237091 titled "A Method and System for Acoustic Communication of Data"

and U.S. Pub. No. 2019/0253154 titled "Method and System for Acoustic Communication of Data," each of which is expressly incorporated by reference herein in its entirety. Other examples are also possible.

d. Lighting Behavior Based on Types of Audio & Context

In another aspect, lighting behavior may be based on one or more of (i) foreground audio, (ii) background audio, or (iii) contextual information. Foreground audio as referred to herein may be audio content that is played back by a playback device. Such audio may include, as some non-limiting examples, music (e.g., an audio track, a playlist, etc.), a podcast, an audio soundtrack accompanying video content, among other possibilities. Background audio as referred to herein may be ambient noise that is detected by the playback device. Such background audio may include, as some non-limiting examples, people talking, water running, dishes clanking, among other possibilities. Contextual information as referred to herein may be general information that is available to the playback device. Such information may include, as some non-limiting examples, a time of day, weather information (e.g., the weather forecast in a geographical location, such as the geographical location of the playback device), calendar information (e.g., meetings, appointments, and/or other calendar events available from a calendar service that is integrated with or otherwise accessible to the playback device), ambient lighting information (e.g., information about light source(s) in proximity of the playback device and/or light source(s) about which the playback device has information or is otherwise able to communicate with), task lists (e.g., to-do lists, grocery lists, etc.), among other possibilities. In some instances, contextual information may include background audio, such as ambient noise (e.g., presence of people based on detecting the sound of people talking, presence of animals based on detecting animal sounds, etc.) ambient audio (e.g., detecting music or television input in the background, etc.). Further, contextual information may be received and/or transmitted in various ways, including via a wired connection, over a local area network, over a wide area network, over a Bluetooth connection, via cloud-based integration, or via ultrasonic transmission, among other possibilities. Based on detecting the (i) foreground audio, (ii) background audio, and/or (iii) contextual information, the playback device may determine given lighting behavior that is to be implemented by one or more lighting device(s) and then cause the lighting device(s) to implement the determined lighting behavior.

Lighting behavior based on foreground audio may take various forms. As one possibility, lighting behavior may be based on the type of audio content that is being played back. For example, audio content that is identified as music (e.g., a playlist, an audio track) may be associated with a given animation, whereas audio content that is identified as a podcast may be associated with a given lighting effect or scene that creates a particular mood based on the genre of the podcast. As another possibility, lighting behavior may be based on the audio characteristics of the audio content. For example, different colors, graphic patterns, and/or rhythmic patterns may be produced based on the tempo or beats per minute of the audio content. Further, the speed of transitions between lighting behaviors (e.g., transitioning from one brightness level to another brightness level, transitioning from one color to another color, transitioning from one type of animation to another type of animation, etc.) may also match or otherwise correspond to the audio characteristics of the audio content.

In this regard, different transition modes may dictate different levels or degrees at which lighting behavior transitions are synced with, delayed by, or responsive to audio characteristics. As one example, lighting behavior transitions may be synced with audio characteristics, such as the beats per minute or tempo of the audio content. As another example, lighting behavior transitions may be based on a range of responsiveness to audio characteristics. The range of responsiveness may be predetermined based on default settings or may be selected based on user input received via a controller device. As one possibility, transitions may be set to a first mode, such as a "vibrant" mode, where the lighting behavior is lively and highly responsive to the audio characteristics. For instance, the lighting behavior may match the rhythm of the audio content. Lighting behavior in this mode may produce vibrant colors, high levels of brightness, and/or quick transitions. As another possibility, transitions may be set to a second mode, such as a "relaxed" mode, where the lighting behavior is tranquil and less responsive to the audio characteristics. For instance, the lighting behavior may respond at a reduced rhythm level (e.g., if the audio content has a rhythm of 90 beats per minute, the lighting behavior may respond as if the audio content had a rhythm of 45 beats per minute). Lighting behavior in this mode may produce softer, muter colors, lower levels of brightness, and/or slower transitions (e.g., cross-fade).

In some implementations, each mode of responsiveness may be associated with a playlist of lighting behaviors that dictates the level of sync, delay, and/or responsiveness to audio characteristics. In some implementations, the range of responsiveness may be adjusted using a spectrum or sliding scale (e.g., adjusted based on user input provided via a controller device). Lighting behavior based on foreground audio may take other forms as well.

Lighting behavior based on background audio may take various forms. As one possibility, the vibrancy of the lighting behavior may be based on the activity level of the background audio. For example, if the background audio is loud and indicates high activity, the lighting behavior may be lively and energetic, producing vibrant colors, higher brightness levels, and/or fast animations and transitions, whereas if the background audio is soft and indicates low activity, the lighting behavior may be tranquil, producing muted colors, lower brightness levels, and/or slower animations and transitions. Furthermore, the presence of background audio may be reflected by specific lighting behavior. For instance, when background audio is detected (e.g., detected by a microphone of the playback device), the lighting behavior may include a given effect or animation that specifically indicates background audio, such as a given shape, color, and/or animation that may respond to changes in the background audio. For example, such lighting behavior may take the form of a blue circle animation that speeds up or slows down in response to a detected increase or decrease in the background audio. Lighting behavior based on background audio may take other forms as well.

Lighting behavior based on contextual information may take various forms. As one possibility, lighting behavior may be based on timing information. For instance, lighting behavior may be directly correlated to the time of day. For example, based on detecting timing indicating sunrise, corresponding lighting behavior may take the form of displaying bright (or increasingly brightening) lighting effects, scenes, and/or animations. As another example, based on detecting nighttime, lighting behavior may take the form of displaying soft lighting effects, scenes, and/or animations. Conversely, lighting behavior may be indirectly correlated to the time of day. For example, based on detecting sunrise, lighting behavior may take the form of decreasing any ongoing lighting effects, scenes, and/or animations, and based on detecting sundown, lighting behavior may take the form of displaying bright lighting effects, scenes, and/or animations. Timing information may be further informed via a sensor component of the playback device, such as a daylight sensor that correlates to a generative music engine. Additional information about generative music engines may be found in U.S. Nonprovisional application Ser. No. 17/140,361, filed Jan. 4, 2021, and titled "Generative Music Based on User Location," and U.S. Provisional Application No. 63/198,866, filed Nov. 18, 2020, and titled "Algorithmically Generated Media Content Playback via one or more Devices," each of which is incorporated by reference herein in its entirety.

As another possibility, lighting behavior may be based on a current operation mode or audio scene of the playback device. For example, if the playback device is set to a "sleep" mode or is implementing a sleep-related audio scene, lighting behavior may comprise softer colors, tranquil scenes, and/or slow animations. Additional information regarding scene systems and operation modes may be found in U.S. Provisional Application No. 63/114,931 entitled, "Playback Roles for Layering of Audio," and U.S. Provisional Application No. 63/190,638 entitled, "Dedicated Controls for Targeted Audio Experience," each of which is incorporated herein by reference in its entirety. In such instances, lighting behavior may further be adjusted based on user input. For example, using a controller device, user input may be provided to restrict lighting behavior to a given color pallet, given scene options, and/or given animation speeds when reacting to a given operation mode or audio scene. Additional information regarding scene systems may be found in U.S. Provisional Application No. 63/114,931 entitled, "Playback Roles for Layering of Audio," and U.S. Provisional Application No. 63/190,638 entitled, "Dedicated Controls for Targeted Audio Experience," each of which is incorporated herein by reference in its entirety.

As yet another possibility, lighting behavior may be based on information about a light source. For example, the type of light source, the light source's respective color temperature, and/or the light source's respective location may indicate a given use/purpose, and lighting behavior may be based on such an indicated use/purpose (e.g., a multi-bulb floor lamp in the living room may indicate the need for bright light, whereas a single-bulb reading lamp in the bedroom may indicate a need for ambient, localized light).

Still, as another possibility, lighting behavior may be based on a combination of audio and contextual information. As one example, based on detecting audio content playback and/or background audio such as running water in the sink and cooking sounds at a playback device located in the kitchen, the playback device may infer that a user is cooking in the kitchen. Accordingly, the playback device may, in addition to playing back audio content, cause one or more light sources located in the kitchen to turn on and/or engage in other lighting behavior to facilitate visibility in the kitchen. Additional information about inferring activity based on noise detection can be found in U.S. Pat. No. 10,871,943 titled "Noise Classification for Event Detection," which is incorporated herein by reference in its entirety. As another example, based on detecting playback of an alarm, lighting behavior may take the form of displaying bright (or increasingly brightening) lighting effects, scenes, and/or animations or displaying certain lighting effects, scenes, and/or animations that correspond to the alarm. As yet another example, lighting behavior may be based on user location and intensity of sound (e.g., audio playback and/or ambient audio) that is detected in the user's proximity. For example, if a playback device is playing back audio and determines that a user is not within close proximity, the playback device may infer that the user is not within the location of the playback device and/or the light source and may thus cause lighting behavior to take the form of softer light, whereas if the playback device determines that the user is within close proximity, the playback device may infer that the user is within the location of the playback device and/or the light source and may thus cause lighting behavior to take the form of brighter light. Other examples are also possible.

e. Activity-Focused Lighting Behavior

In some implementations, certain aspects of lighting behavior may each be based on different types of audio and/or contextual information. As one possibility, certain aspects of lighting behavior may be adjusted based on a user command. For example, while a light source (e.g., an LED grid, a set of multiple lights distributed throughout a room) is engaged in given lighting behavior (e.g., displaying a given brightness level, color, and animation) based on audio playback, a user may issue a command (e.g., a voice input command or a command input via a controller device) to focus lights on the user. The command may be detected by a playback device that is configured to communicate with the light source. Based on detecting the command to focus lights on the user and the location of the user relative to the playback device, the playback device may cause the light source to adjust its light coverage to focus in on the user, such as by brightening those lights closer to the user and dimming those lights further away from the user and/or by orienting the lights toward the user's direction. Notably, other lighting behavior, such as animations, that was previously being displayed may continue uninterrupted.

As another possibility, certain aspects of lighting behavior may be adjusted in response to contextual information. For instance, while a light source (e.g., an LED grid, a set of multiple lights distributed throughout a room) is performing given lighting behavior (e.g., displaying a given brightness level, color, and animation) based on audio playback, a playback device may detect contextual information and adjust certain lighting behavior accordingly. For example, a user may be engaged in a virtual performance (e.g., live streaming a concert) whereby audio content is playing and corresponding lighting behavior is being displayed in the user's background (e.g., a playback device associated with the user is playing audio content and causing a light source to display given lighting behavior based on the audio playback). The playback device may detect incoming chats on the livestream platform via a communicatively coupled controller device. Based on detecting keywords, reactions, and/or metadata in the incoming chats, the playback device may cause the light source to adjust certain aspects of its lighting behavior in response to the detected keywords, reactions, and/or metadata while continuing to display the other aspects of its lighting behavior uninterrupted.

As yet another possibility, while operating in a first mode (e.g., a default playback mode), the playback device may monitor for voice input and/or background audio in order to take action to adjust lighting behavior in accordance with the detected voice input and/or background audio. For example, while playing back audio content, a playback device in the kitchen may detect sounds corresponding to a fridge door opening and closing and dinnerware being taken out of a cabinet. The playback device may thus infer that a user plans to eat and may thus cause one or more kitchen lights to turn on. As another example, a playback device in a hallway leading to a bedroom may detect a voice command to turn on the hallway light. Thus, the playback device may cause the hallway light to turn on and may further cause additional lights, such as the bedroom lights, to turn on as well in anticipation of the user walking through the hallway and into the bedroom.

f. Lighting Behavior Based on Connected Devices

In some implementations, lighting behavior may be based on settings of a computing device (e.g., smartphone, tablet, laptop, etc.) that is communicatively coupled to a playback device that is configured to communicate with a light source. As one possibility, lighting behavior may be based on one or more settings of the computing device. For example, the playback device may determine that a blue light filter setting of the computing device is turned on and may thus cause the light source to display a blue-hued lighting effect.

In some implementations, lighting behavior may be based on media content that is being played back on a computing device (e.g., smartphone, tablet, laptop, etc.) that is communicatively coupled to a playback device that is configured to communicate with a light source. As one possibility, lighting behavior may be based on media content that is being played back on the computing device. For example, the playback device may detect that a user is streaming media content (e.g., watching a movie or listening to a song) on the computing device and may determine one or more colors associated with the media content (e.g., colors based on art associated with the movie or album art associated with the song) based on, for example, available metadata associated with the media content, among other possibilities. In turn, the playback device may cause the light source to display a lighting effect and/or animation based on the determined colors associated with the media content.

As another possibility, lighting behavior may be based on different audio channels of audio content that is being played back on the computing device. For instance, a user may be watching an instructional video on the computing device, such as a yoga video. The playback device may monitor the audio stream associated with the video to detect certain keywords and/or determine certain audio channels of the audio stream. Additionally, or alternatively, the playback device may obtain information about the video and associated audio stream via available metadata, separate protocol, and/or a sub-band including information regarding control signals that the playback device may use to implement lighting behavior. Based on the detected keywords and/or determined audio channels, the playback device may cause the light source to implement given lighting behavior. For example, the playback device may detect that the audio stream directs the user to "look to your left" and may thus cause the light source to direct light toward the user's left side, such as by brightening lights on the user's left side and dimming all other lights. As another example, the playback device may detect keywords that depict certain scenes and cause the light source to implement given lighting behavior to mimic the scene. For instance, the playback device may detect the word "sunshine" in the audio stream and thus cause the light source to produce a lighting effect reflecting colors associated with sunshine and/or morning, and may additionally play back morning sounds, such as birds chirping. As yet another example, the playback device may detect action trigger words—such as "inhale" and "exhale"—and cause the light source to implement lighting behavior that mimics or guides the action. For example, based on the "inhale" action trigger word, the playback device may cause the light source to display a brightening lighting effect and/or a "rising" animation, and based on the "exhale" action trigger word, the playback device may cause the light source to display a dimming lighting effect and/or a "lowering" animation. In this way, the playback device may control, customize, and/or adapt lighting experiences within a user's home either in real-time or based on pre-determined information. Other examples are also possible.

As yet another possibility, lighting and/or listening experiences may be shared across different households, either live or asynchronously. This may be done using a streaming service that enables sharing of not only audiovisual content (e.g., music, exercise classes, concerts, grouped video watching, etc.), but also lighting experience. For example, a streaming service (e.g., Sonos HD Radio) that can communicate with a remote computing device associated with the playback device may be able to access information about lighting behavior of one or more light sources with which the playback device is configured to communicate. A user of the playback device may then be able to broadcast, via a GUI displayed on a controller device associated with the playback device, a given listening and lighting experience with other users of the streaming service in different households such that users in different homes can participate in a same audiovisual experience. Additional information about mirrored experiences across different households may be found in U.S. Pat. No. 10,587,693 titled "Mirrored Queues." Other examples are also possible.

Figure 5:
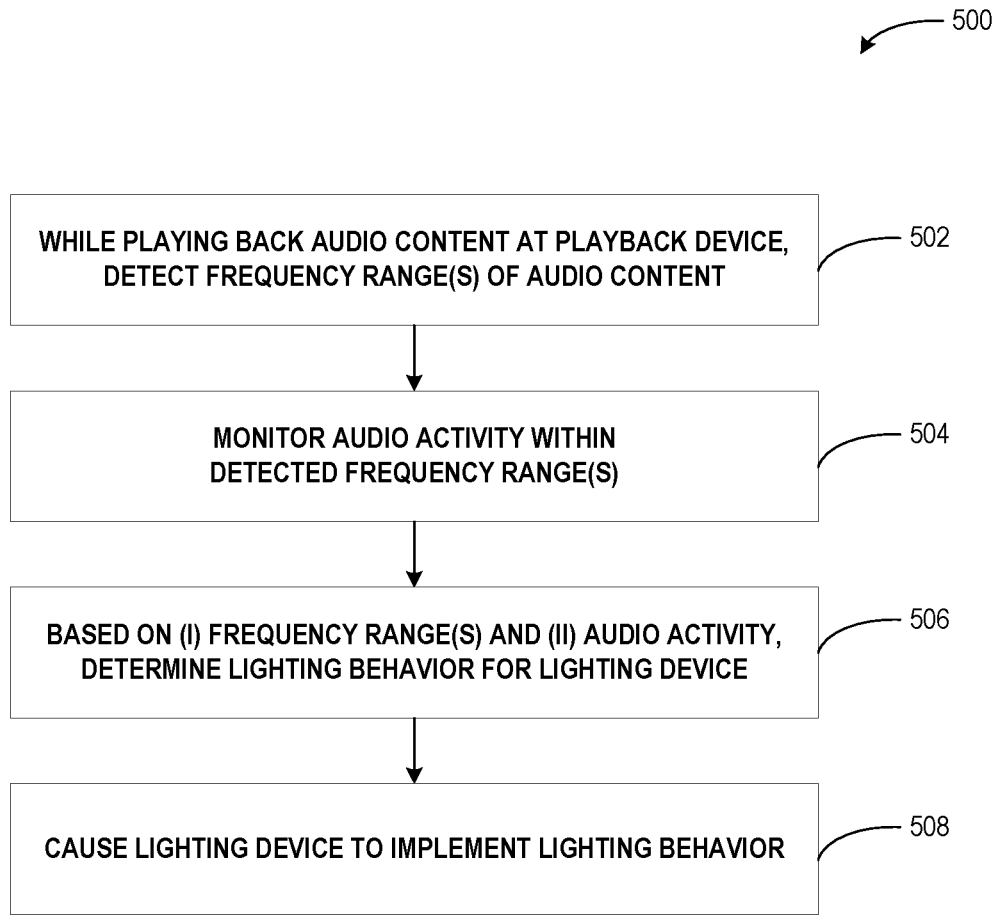
FIG. 5 is a flow diagram of one example process according to the disclosed techniques.
Figure 6:
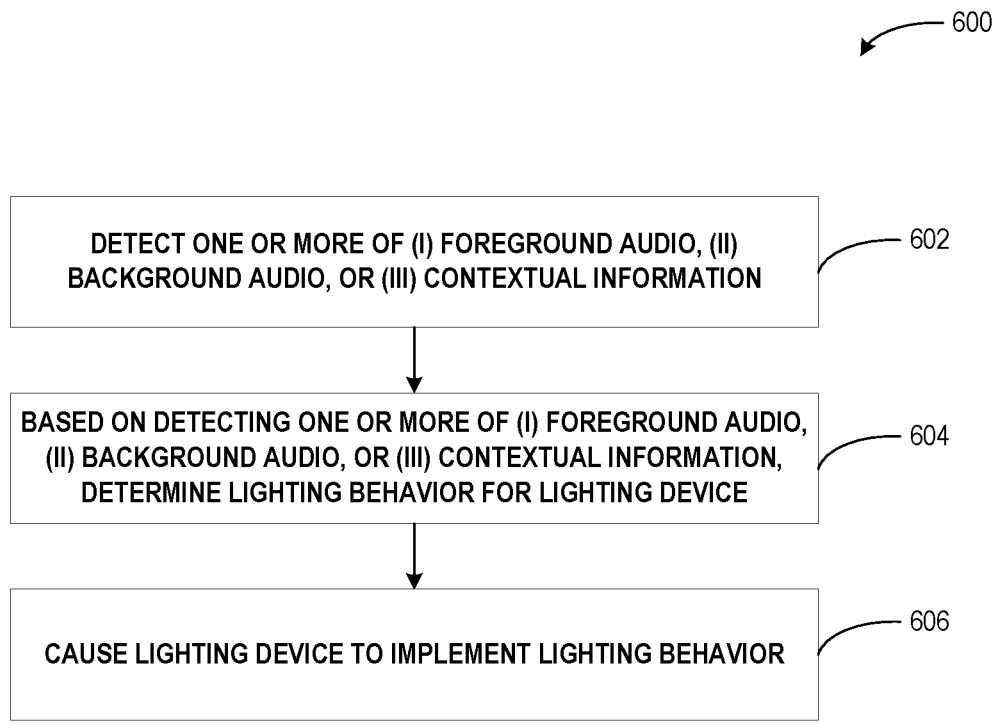
FIG. 6 is a flow diagram of another example process according to the disclosed techniques.
Figure 7:
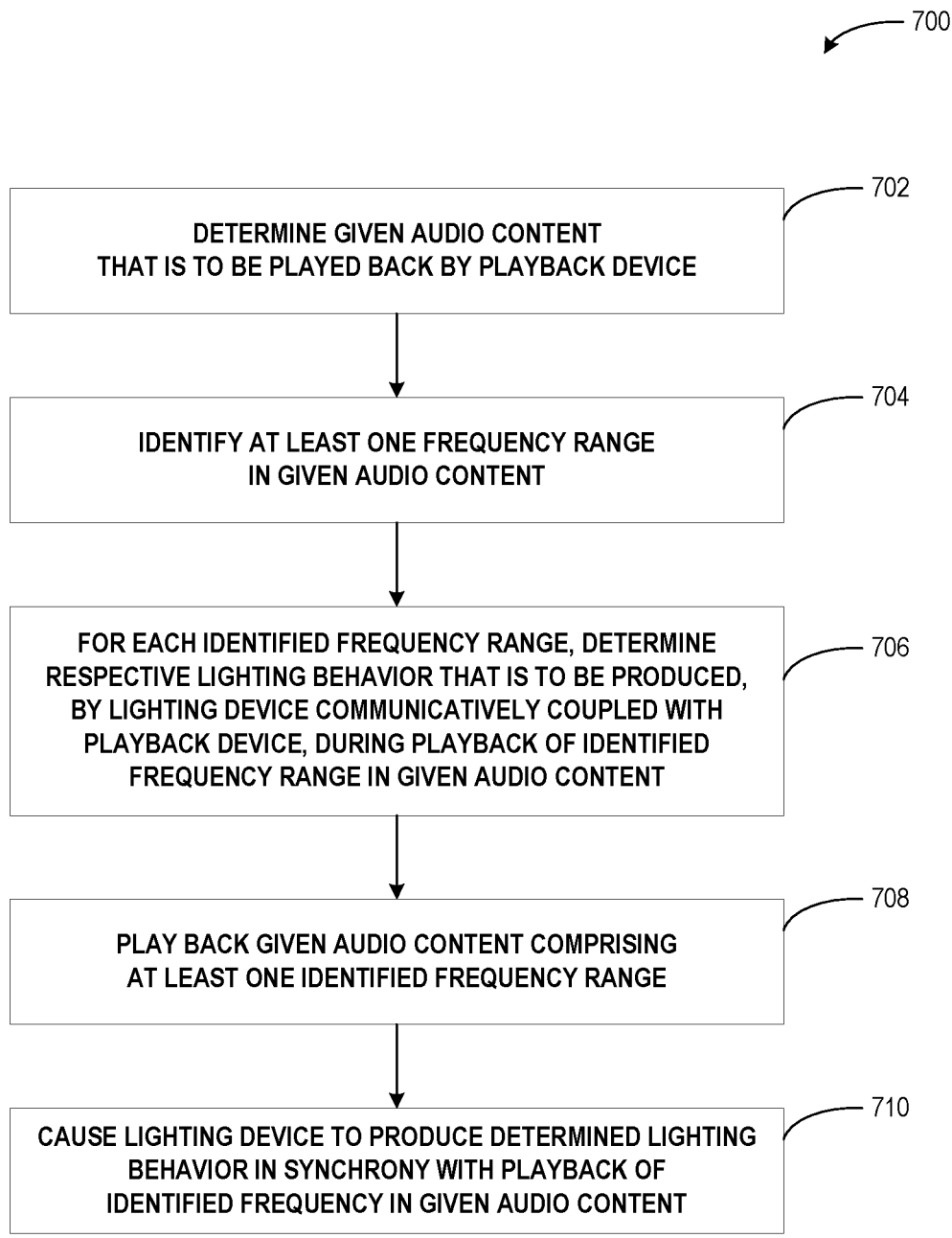
FIG. 7 is a flow diagram of yet another example process according to the disclosed techniques.

FIGS. 5, 6, and 7 include one or more operations, functions, or actions as illustrated by operational blocks 502-508, 602-606, and 702-710, for example processes of determining lighting behavior according to techniques and embodiments disclosed herein. Although the blocks 502-508, 602-606, and 702-710 are illustrated in a given order, some of the blocks may also be performed in parallel, and/or in a different order than those described herein. Also, the various blocks may be combined into fewer blocks, divided into additional blocks, and/or removed based upon the desired implementation.

In addition, for the flowcharts shown in FIGS. 5-7 and other processes and methods disclosed herein, each flowchart shows functionality and operation of one possible implementation of embodiments disclosed herein. In this regard, each block may represent a module, a segment, or a portion of program code, which includes one or more instructions executable by one or more processors for implementing logical functions or blocks in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the processes and methods disclosed herein, each block in FIGS. 5-7 may represent circuitry and/or machinery that is wired or arranged to perform the specific functions in the process.

With reference first to FIG. 5, the example process 500 that may be carried out by a playback device for determining lighting behavior based on audio frequencies of audio content. The example process 500 may begin at block 502, where the playback device, while playing back audio content, may detect one or more frequency ranges of the audio content. The playback device may detect the one or more frequency ranges using any of the various techniques disclosed herein. At block 504, the playback device may monitor audio activity within the one or more detected frequency ranges. At block 506, based on (i) the one or more detected frequency ranges and (ii) the monitored audio activity, the playback device may determine lighting behavior for a lighting device that is communicatively coupled to the playback device. In line with the discussion above, the lighting behavior may be based on one or more capabilities of the lighting device. At block 508, the playback device may cause the lighting device to implement the lighting behavior. In line with the discussion above, this may involve transmitting a message to the lighting device(s) that includes (i) an instruction to implement the lighting behavior and (ii) timing information regarding when to implement the lighting behavior.

FIG. 6 depicts a flowchart of an example process 600 that may be carried out by a playback device for determining lighting behavior based on one or more of different types of audio or context information. The example process 600 may begin at block 602, where the playback device may detect one or more of (i) foreground audio, (ii) background audio, or (iii) contextual information. At block 604, based on detecting one or more of the (i) foreground audio, (ii) background audio, or (iii) contextual information, the playback device may determine lighting behavior for a lighting device that is communicatively coupled to the playback device. In line with the discussion above, the lighting behavior may be based on one or more capabilities of the lighting device. At block 606, the playback device may cause the lighting device to implement the determined lighting behavior. In line with the discussion above, this may involve transmitting a message to the lighting device(s) that includes (i) an instruction to implement the lighting behavior and (ii) timing information regarding when to implement the lighting behavior.

FIG. 7 depicts a flowchart of an example process 700 that may be carried out by a playback device for determining lighting behavior based on audio frequencies of audio content. The example process 700 may begin at block 702, where the playback device may determine given audio content that is to be played back by the playback device. At block 704, the playback device may identify at least one frequency range in the given audio content. At block 706, for each identified frequency range in the given audio content, the playback device may determine a respective lighting behavior that is to be produced, by a lighting device that is communicatively coupled with the playback device, during playback of the identified frequency range in the given audio content. At block 708, the play back device may play back the given audio content comprising the at least one identified frequency range. At block 710, the playback device may cause the lighting device to produce the determined lighting behavior in synchrony with playback of the identified frequency in the given audio content. In line with the discussion above, this may involve transmitting one or more messages to the lighting device comprising (i) one or more instructions to produce respective lighting behavior during playback of each identified frequency in the given audio content and (ii) timing information regarding when to produce each respective lighting behavior.

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A playback device comprising:
   at least one processor;
   at least one non-transitory computer-readable medium; and
   program instructions stored on the at least one non-transitory computer-readable medium that are executable by at least one processor such that the playback device is configured to:
   determine a command to play back given audio content;
   identify at least one frequency range in the given audio content;

obtain data defining lighting behavior corresponding to each of a plurality of frequency ranges including the at least one frequency range, wherein the lighting behavior corresponding to the plurality of frequency ranges was defined via a user interface of a controller device that is communicatively coupled with the playback device;

based on the obtained data defining the lighting behavior, for each identified frequency range in the given audio content, determine a respective lighting behavior that is to be produced, by a lighting device that is communicatively coupled with the playback device over a wireless data network, during playback of the identified frequency range by the playback device;

play back the given audio content comprising the at least one identified frequency range;

cause the lighting device to produce the determined respective lighting behavior corresponding to each identified frequency range in the given audio content in synchrony with the playback of the identified frequency range by the playback device;

while playing back the given audio content, determine, based on detected sound, new lighting behavior that is to be produced by the lighting device, wherein the new lighting behavior is dynamically responsive to audio characteristics, activity levels, or volume levels of the detected sound; and cause the lighting device to transition from producing the determined respective lighting behavior in synchrony with the playback of the given audio content by the playback device to producing the new lighting behavior that is dynamically responsive to the detected sound; and continue playing back the given audio content.

2. The playback device of claim 1, wherein each respective lighting behavior comprises one of (i) a given lighting effect, (ii) a given lighting scene, or (iii) a given lighting animation.

3. The playback device of claim 1, further comprising program instructions stored on the at least one non-transitory computer-readable medium that are executable by the at least one processor such that the playback device is configured to:

determine a time-domain representation of the given audio content; and wherein the program instructions that are executable by the at least one processor such that the playback device is configured to identify the at least one frequency range in the given audio content comprise program instructions that are executable by the at least one processor such that the playback device is configured to:

convert the time-domain representation to a frequency-domain representation.

4. The playback device of claim 1, wherein the program instructions that are executable by the at least one processor such that the playback device is configured to determine the respective lighting behavior comprise program instructions that are executable by the at least one processor such that the playback device is configured to:

dynamically associate the identified frequency range with a given lighting behavior, wherein the given lighting behavior is selected from a set of one or more available lighting behaviors.

5. The playback device of claim 4, wherein the set of one or more available lighting behaviors is based on one or more lighting capabilities of the lighting device.

6. The playback device of claim 1, wherein the program instructions that are executable by the at least one processor such that the playback device is configured to determine the respective lighting behavior comprise program instructions that are executable by the at least one processor such that the playback device is configured to:

associate the identified frequency range with a given lighting behavior based on a predetermined selection of corresponding sets of frequency range and lighting behaviors.

7. The playback device of claim 1, further comprising program instructions stored on the at least one non-transitory computer-readable medium that are executable by the at least one processor such that the playback device is configured to:

monitor audio activity within each identified frequency range.

8. The playback device of claim 7, wherein the program instructions that are executable by the at least one processor such that the playback device is configured to determine the respective lighting behavior comprise program instructions that are executable by the at least one processor such that the playback device is configured to:

determine the respective lighting behavior based on the monitored audio activity within the identified frequency range.

9. The playback device of claim 1, wherein the program instructions that are executable by the at least one processor such that the playback device is configured to cause the lighting device to produce the determined respective lighting behavior corresponding to each identified frequency range in the given audio content in synchrony with the playback of the identified frequency range by the playback device comprise program instructions that are executable by the at least one processor such that the playback device is configured to:

instruct the lighting device to produce the respective lighting behavior for each identified frequency range in the given audio content; and provide, to the lighting device, timing information indicating when to produce each respective lighting behavior.

10. The playback device of claim 1, wherein the new lighting behavior is determined based further on contextual information comprising one or more of timing information, information about an operation mode of the playback device, or information about user proximity to the playback device.

11. A non-transitory computer-readable medium, wherein the non-transitory computer-readable medium is provisioned with program instructions that, when executed by at least one processor, cause a playback device to:

determine a command to play back given audio content;

identify at least one frequency range in the given audio content;

obtain data defining lighting behavior corresponding to each of a plurality of frequency ranges including the at least one frequency range, wherein the lighting behavior corresponding to the plurality of frequency ranges was defined via a user interface of a controller device that is communicatively coupled with the playback device;

based on the obtained data defining the lighting behavior, for each identified frequency range in the given audio content, determine a respective lighting behavior that is to be produced, by a lighting device that is communicatively coupled with the playback device over a wireless data network, during playback of the identified frequency range by the playback device;

play back the given audio content comprising the at least one identified frequency range;

cause the lighting device to produce the determined respective lighting behavior corresponding to each identified frequency range in the given audio content in synchrony with the playback of the identified frequency range by the playback device;

while playing back the given audio content, determine, based on detected sound, new lighting behavior that is to be produced by the lighting device, wherein the new lighting behavior is dynamically responsive to audio characteristics, activity levels, or volume levels of the detected sound;

cause the lighting device to transition from producing the determined respective lighting behavior in synchrony with the playback of the given audio content by the playback device to producing the new lighting behavior that is dynamically responsive to the detected sound; and continue playing back the given audio content.

12. The non-transitory computer-readable medium of claim 11, wherein each respective lighting behavior comprises one of (i) a given lighting effect, (ii) a given lighting scene, or (iii) a given lighting animation.

13. The non-transitory computer-readable medium of claim 11, wherein the non-transitory computer-readable medium is also provisioned with program instructions that, when executed by at least one processor, cause the playback device to:

determine a time-domain representation of the given audio content; and wherein the program instructions that, when executed by at least one processor, cause the playback device to identify the at least one frequency range in the given audio content comprise program instructions that, when executed by at least one processor, cause the playback device to:

convert the time-domain representation to a frequency-domain representation.

14. The non-transitory computer-readable medium of claim 11, wherein the program instructions that, when executed by at least one processor, cause the playback device to determine the respective lighting behavior comprise program instructions that, when executed by at least one processor, cause the playback device to:

dynamically associate the identified frequency range with a given lighting behavior, wherein the given lighting behavior is selected from a set of one or more available lighting behaviors.

15. The non-transitory computer-readable medium of claim 11, wherein the program instructions that, when executed by at least one processor, cause the playback device to determine the respective lighting behavior comprise program instructions that, when executed by at least one processor, cause the playback device to:

associate the identified frequency range with a given lighting behavior based on a predetermined selection of corresponding sets of frequency ranges and lighting behaviors.

16. The non-transitory computer-readable medium of claim 11, wherein the non-transitory computer-readable medium is also provisioned with program instructions that, when executed by at least one processor, cause the playback device to:

monitor audio activity within each identified frequency range.

17. The non-transitory computer-readable medium of claim 16, wherein the program instructions that, when executed by at least one processor, cause the playback device to determine the respective lighting behavior comprise program instructions that, when executed by at least one processor, cause the playback device to:

determine the respective lighting behavior based on the monitored audio activity within the identified frequency range.

18. The non-transitory computer-readable medium of claim 11, wherein the program instructions that, when executed by at least one processor, cause the playback device to cause the lighting device to produce the determined respective lighting behavior corresponding to each identified frequency range in the given audio content in synchrony with the playback of the identified frequency range by the playback device comprise program instructions that, when executed by at least one processor, cause the playback device to:

instruct the lighting device to produce the respective lighting behavior for each identified frequency range in the given audio content; and provide, to the lighting device, timing information indicating when to produce each respective lighting behavior.

19. A method carried out by a playback device, the method comprising:

determining a command to play back given audio content;

identifying at least one frequency range in the given audio content;

obtaining data defining lighting behavior corresponding to each of a plurality of frequency ranges including the at least one frequency range, wherein the lighting behavior corresponding to the plurality of frequency ranges was defined via a user interface of a controller device that is communicatively coupled with the playback device;

based on the obtained data defining the lighting behavior, for each identified frequency range in the given audio content, determining a respective lighting behavior that is to be produced, by a lighting device that is communicatively coupled with the playback device over a wireless data network, during playback of the identified frequency range by the playback device;

playing back the given audio content comprising the at least one identified frequency range;

causing the lighting device to produce the determined respective lighting behavior corresponding to each identified frequency range in the given audio content in synchrony with the playback of the identified frequency range by the playback device;

while playing back the given audio content, determining, based on detected sound, new lighting behavior that is to be produced by the lighting device, wherein the new lighting behavior is dynamically responsive to audio characteristics, activity levels, or volume levels of the detected sound;

cause the lighting device to transition from producing the determined respective lighting behavior in synchrony with the playback of the given audio content by the playback device to producing the new lighting behavior that is dynamically responsive to the detected sound; and continue playing back the given audio content.

20. The method of claim 19, wherein each respective lighting behavior comprises one of (i) a given lighting effect, (ii) a given lighting scene, or (iii) a given lighting animation.

21. The method of claim 19, wherein causing the lighting device to produce the determined respective lighting behavior corresponding to each identified frequency range in the given audio content in synchrony with the playback of the identified frequency range by the playback device comprises:
- instructing the lighting device to produce the respective lighting behavior for each identified frequency range in the given audio content; and
- providing, to the lighting device, timing information indicating when to produce each respective lighting behavior.

* * * * *